(12) United States Patent
Scheim et al.

(10) Patent No.: US 7,567,635 B2
(45) Date of Patent: Jul. 28, 2009

(54) SINGLE ANTENNA INTERFERENCE SUPPRESSION IN A WIRELESS RECEIVER

(75) Inventors: Jacob Scheim, Pardes Hanna (IL); Amir Ingber, Petah Tikva (IL); Yonathan Morin, Kfar Saba (IL); Evgeny Yakhnich, Hadera (IL)

(73) Assignee: Comsys Communication & Signal Processing Ltd., Herzelia (IL)

( * ) Notice: Subject to any disclaimer, the term of this patent is extended or adjusted under 35 U.S.C. 154(b) by 538 days.

(21) Appl. No.: 11/371,665

(22) Filed: Mar. 7, 2006

(65) Prior Publication Data

US 2006/0203943 A1    Sep. 14, 2006

Related U.S. Application Data

(60) Provisional application No. 60/660,206, filed on Mar. 10, 2005.

(51) Int. Cl.
*H04L 27/06* (2006.01)
(52) U.S. Cl. ..................... 375/341
(58) Field of Classification Search ......... 375/229–230, 375/262, 265, 340–341, 343, 346
See application file for complete search history.

(56) References Cited

U.S. PATENT DOCUMENTS

| | | | | |
|---|---|---|---|---|
| 5,657,354 | A | 8/1997 | Thesling, III et al. | 375/332 |
| 5,724,390 | A * | 3/1998 | Blaker et al. | 375/229 |
| 5,848,105 | A | 12/1998 | Gardner et al. | 375/336 |
| 6,249,518 | B1 | 6/2001 | Cui | 370/347 |
| 6,298,102 | B1 | 10/2001 | Rainish et al. | 375/341 |
| 6,314,147 | B1 | 11/2001 | Liang et al. | 375/346 |
| 6,529,559 | B2 | 3/2003 | Reshef | 375/262 |
| 6,731,700 | B1 * | 5/2004 | Yakhnich et al. | 375/341 |

(Continued)

FOREIGN PATENT DOCUMENTS

EP    1475933 A1    11/2004

OTHER PUBLICATIONS

H. Trigui and D.T.M. Slock, "Training Sequence Based Multiuser Channel Identification for Cochannel Interface Cancellation in GSM," SPAWC '99—Second IEEE Workshop on Signal Processing Advances in Wireless Communications, pp. 102-105, May 9-12, 1999.

(Continued)

*Primary Examiner*—Khanh C Tran
(74) *Attorney, Agent, or Firm*—Zaretsky Patent Group PC; Howard Zaretsky

(57) ABSTRACT

A novel and useful apparatus for and method of single antenna interference cancellation (SAIC) in a wireless communications system. A class of algorithms is disclosed for Downlink Advanced Receiver Performance (DARP) receivers based on a novel metric calculation used during equalization and optionally in other portions of the receiver as well, e.g., soft value generation. A DARP receiver for 8PSK EDGE modulation is presented wherein the interfering signals comprise GMSK modulated signals. The modified metric takes into account the rotation remaining in the noise component of the received signal after de-rotation of the 8PSK signal. Considering the interferer to be a GMSK signal, the I/Q elements of the noise are correlated and this fact is used to modify the decision rule for the received signal thus improving the performance of the equalizer. The model is further extended to take into account temporal error correlation.

25 Claims, 11 Drawing Sheets

U.S. PATENT DOCUMENTS

| | | | |
|---|---|---|---|
| 6,907,092 B1 | 6/2005 | Yakhnich et al. | 375/346 |
| 6,944,242 B2 | 9/2005 | Yakhnich et al. | 375/341 |
| 6,944,245 B2 | 9/2005 | Stewart et al. | 375/350 |
| 7,109,787 B2* | 9/2006 | Meyer | 329/304 |
| 2003/0115061 A1* | 6/2003 | Chen | 704/240 |
| 2004/0192215 A1 | 9/2004 | Onggosanusi et al. | 455/67.13 |
| 2007/0140320 A1* | 6/2007 | Banna et al. | 375/148 |

OTHER PUBLICATIONS

H. Schoeneich and P.A. Hoeher, "Single Antenna Interference Cancellation: Iterative Semi-Blind Algorithm and Performance Bound for joint Maximum-Likelihood Interference Cancellation," GLOBECOM 2003, pp. 1716-1720, Aug. 2003.

R. Raheli et al., "Per-Survivor Processing: A General Approach to MLSE in Uncertain Environments," *IEEE Trans Comm*, vol. 43, Nos. 2/3/4, pp. 354-364, Feb./Mar./Apr. 1995.

F. Nordstom et al., "Interferer Cancellation in TDMA-Systems," 5th Nordic Signal Processing Symposium, Hurtigruten, Tromso to Trondheim, Norway: The Norwegian Signal Processing Society and IEEE Norway Section, 2002.

A. Mostafa et al., "Single Antenna Interference Cancellation (SAIC) for GSM Networks," *Proc. IEEE VTC*, pp. 1089-1093, Oct. 2003.

J.G. Andrews, "Interference Cancellation for Cellular Sysmtes: A Contemporary Overview," *IEEE Wireless Communications Magazine*, pp. 1-22, May 19, 2004.

A. Hafeez et al., "Interference Cancellation for EDGE via Two-User Joint Demodulation," VTC Fall 2003, vol. 2, pp. 1025-1029, Oct. 2003.

M. Barberis et al., "Design of an Interference-Resistant Equalizer for EDGE Cellular Radio," VTC Fall 2002, vol. 3, pp. 1622-1626, Sep. 2002.

M Pukkila et al., "Constant Modulus Single Antenna Interference Cancellation for GSM," VTC Spring 2004, vol. 1, pp. 584-588, May 2004.

P.A. Ranta et al., "Co-Channel Interference Cancelling Recevier for TDMA Mobile Systems," *International Conference on Communications*, ICC' 95, Seattle, pp. 17-21, Jun. 1995.

M. Loncar, "Co-Channel Interference Mitigation in GSM Networks by Iterative Estimation of Channel and Data," *European Trans. Telecomm.*, vol. 14, No. 1, pp. 71-80, Jan. 2003.

D.T.M. Slock and H. Trigui, "An Interference Cancelling Multichannel Matched Filter," GLOBECOM '96, pp. 214-218, Nov. 18-22, 1996.

J.T. Chen et al., "Low-Complexity Joint MLSE Receiver in the Presence of CCI," *IEEE Communication Letters*, vol. 2, No. 5, pp. 125-127, May 1998.

Annex L: Reference Test Scenarios for DARP, 3GPP TS 45.005, 3GPP Technical Specification Group GSM/EDGE Radio Access Network; Radio transmission and reception (Release 6), Jan. 2006.

\* cited by examiner

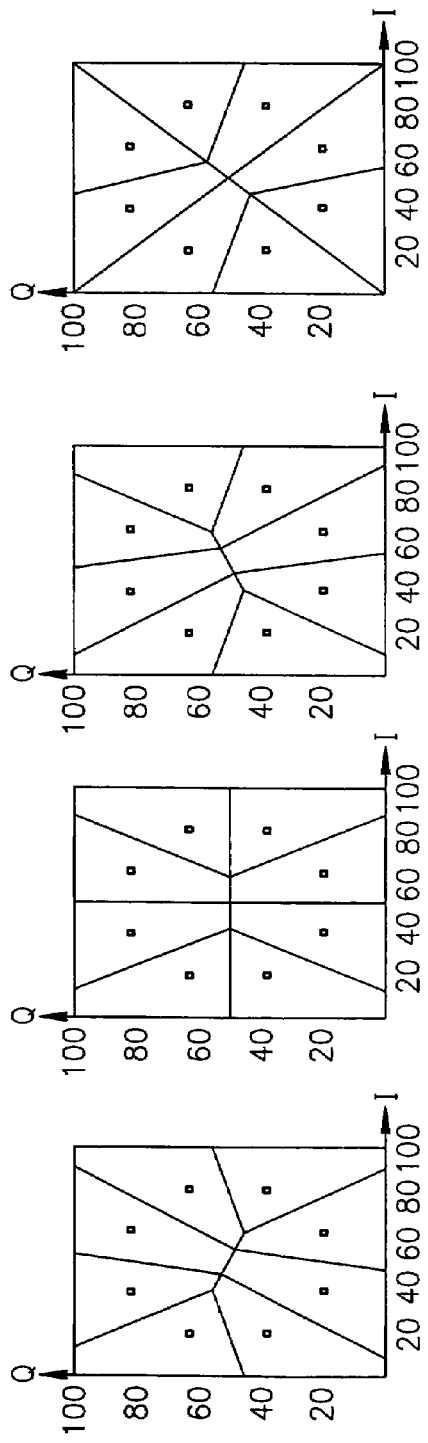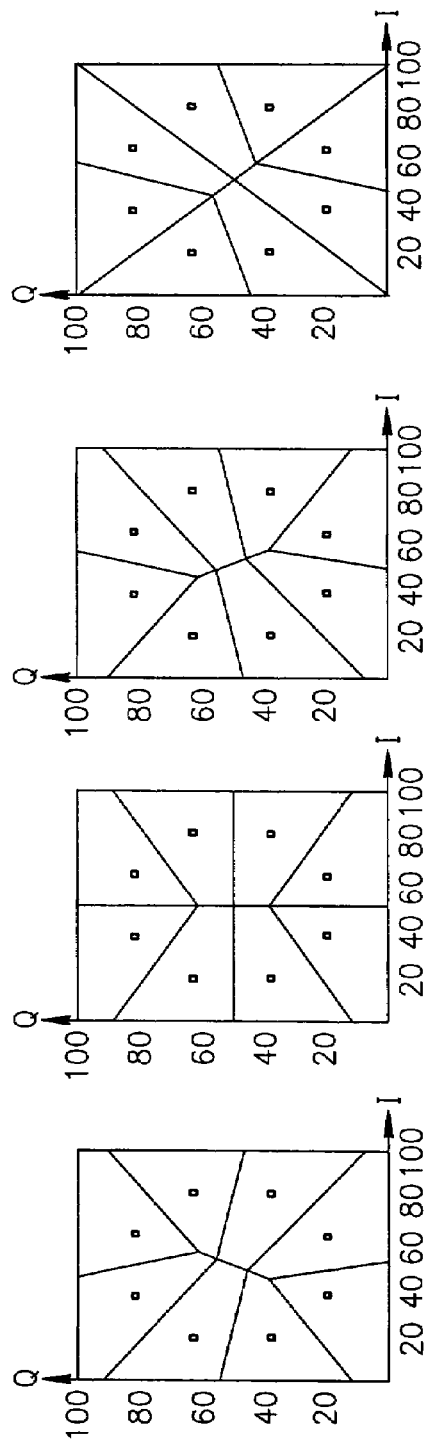

SINGLE ANTENNA INTERFERENCE SUPPRESSION IN A WIRELESS RECEIVER

REFERENCE TO PRIORITY APPLICATION

This application claims priority to U.S. Provisional Application Ser. No. 60/660,206, filed Mar. 10, 2005, entitled "Single Antenna Interference Cancellation," incorporated herein by reference in its entirety.

FIELD OF THE INVENTION

The present invention relates generally to wireless communication systems and more particularly relates to an apparatus and method of single antenna interference cancellation for use in 8PSK EDGE receivers.

BACKGROUND OF THE INVENTION

In recent years, the world has witnessed explosive growth in the demand for wireless communications and it is predicted that this demand will increase in the future. There are already over 1.5 billion users subscribing to cellular telephone services and the number is continually increasing. The number of GSM users around the world alone has already crossed the 1.2 billion mark, as an example of the increased use of cellular services. One in five people around the world now has a mobile phone and in some developed markets mobile penetration has already approached 100%. It is predicted that by 2010 there will be over 2.3 billion individual wireless subscribers worldwide.

In some countries, the number of cellular subscribers already exceeds the number of fixed line telephone installations. In many cases, the revenues from mobile services exceeds that for fixed line services even though the amount of traffic generated through mobile phones is less than in fixed networks.

Other related wireless technologies have experienced growth similar to that of cellular. For example, cordless telephony, two way radio trunking systems, paging (one way and two way), messaging, wireless local area networks (WLANs), wireless local loops (WLLs), WiMAX and Ultra Wideband (UWB) based MANs.

Currently, the majority of users subscribe to digital cellular networks. Almost all new cellular handsets sold to customers are based on digital technology, typically third generation digital technology. Currently, fourth generation digital networks are being designed and tested which will be able to support data packet networks and much higher data rates. The first generation analog systems comprise the well known protocols AMPS, TACS, etc. The digital systems comprise GSM/GPRS/EGPRS, TDMA (IS-136), CDMA (IS-95), UMTS (WCDMA), etc. Future fourth generation cellular services are intended to provide mobile data at rates of 100 Mbps or more.

A problem exists in wireless communication systems such as GSM, however, where stray signals, or signals intentionally introduced by frequency reuse methods, can interfere with the proper transmission and reception of voice and data signals and can lower capacity. The constant increase in the deployment of cellular networks increases both the levels of background interference and interference due to co-channel transmission. For typical cell layouts, the major source of noise and interference experienced by GSM communication devices when the network is supporting a non-trivial number of users is due to co-channel and/or adjacent channel interference. Such noise sources arise from nearby devices transmitting on or near the same channel as the desired signal, or from adjacent channel interference, such as noise arising on the desired channel due to spectral leakage. A diagram illustrating an example cellular network including a plurality of EDGE transmitters and receivers and GMSK transmitters generating co-channel interference is shown in FIG. 1. The example cellular network, generally referenced 100, comprises an EDGE transmitter 102 and receiver 106 for sending and receiving a main, desired signal. A plurality of GSM transmitters 104, outputting a GMSK signal, generate co-channel interference at the EDGE receiver 106.

The interference from these noise sources is sensed in both mobile terminals and base stations. In areas with dense cellular utilization a severe degradation in network performance is reported due to this effect. Furthermore, cellular operators with low network bandwidth are forced to lower the reuse factor in their networks which further increases the rate of channel co-transmissions. The problem of co-channel transmissions poses a disjoint problem for both the receiver at the base station and the receiver at the mobile station.

For the base station the co-channel interference problem is considered simpler than in the case of mobile terminals. One reason for that is that the higher cost of base station equipment permits the insertion of complex receivers to combat the sensed interferences. The receivers in the base station (1) incorporate algorithms with higher levels of complexity, (2) can have higher power consumption, etc. Another reason the co-channel interference problem is considered simpler in the base station than in the case of mobile terminals is that the base station can utilize smart antennas to help deal with the problem of co-channel interference. Although smart antennas will affect the cost of the base station, its main impact is in the physical size of the antenna. Due to the size of the smart antenna, its use with mobile, portable cellular equipment is severely limited. Its use with base stations, however, is not limited considering the relatively large sized antennas permitted for base stations. The size of base station antennas is practically unbounded and therefore the usage of smart phased array antennas is possible. This enables the use of receive diversity techniques with multi user separation capability.

In the mobile terminal, on the other hand, both complexity and size are crucial factors in the applicability of a solution. Firstly, complex solutions lead to high MIPS consumption which typically causes increased power consumption as well as increased costs. Secondly, the physical size of the mobile terminal is limited. The tiny size of pocket-sized mobile terminals today substantially limits the expected effectiveness in choosing a smart antenna solution, leaving them for base station applications only.

Therefore, in order for cellular networks to remain effective, there is renewed interest in simple interference reduction solutions that are applicable with a single antenna input. Recently, there is great interest in developing an effective interference reduction solution with regard to GSM networks especially for voice applications. This is because the coverage of EGPRS services is expected to increase greatly and it is expected that existing GSM transmissions will appear as co-channel interference to EDGE receivers.

Prior art solutions to the problem can generally be divided into two families: (1) joint solutions where some kind of knowledge about the interference is assumed such as a known training sequence (TSC) and (2) blind solutions where no a priori knowledge regarding the interfering signal is undertaken. The first family, which is considered to result in a more complex solution, may be separated into two subsets: (a) iterative solutions and (b) joint solutions. Iterative solutions correspond to a receiver where the strongest signal is first demodulated and then in a second step, a residual error signal from the first step is demodulated to estimate the co-existing signal (which may be the main signal of interest and the interfering signal as well). This iteration may be performed many times until a stopping criterion is fulfilled. In joint solutions the main signal and the interfering signal are jointly demodulated assuming a joint received signal model.

A blind solution, on the other hand, does not assume any a priori knowledge about the interfering signal. The most common approach taken is to use a higher order statistics model for the interfering signal. Although, a blind solution is expected to be advantageous in terms of complexity and robustness, it is usually at the expense of performance.

Many prior art interference cancellation techniques have focused on adjacent channel suppression which uses several filtering operations to suppress the frequencies of the received signal that are not also occupied by the desired signal. Co-channel interference techniques, such as joint demodulation, generally require joint channel estimation methods to provide a joint determination of the desired and co-channel interfering signal channel impulse responses. Given known training sequences, all the co-channel interferers can be estimated jointly. This joint demodulation technique, however, consumes a large number of MIPS processing, which limits the number of equalization parameters that can be used efficiently. Moreover, classical joint demodulation only addresses one co-channel interferer, and does not address adjacent channel interference.

Multiple antenna techniques have also been proposed but these are complex in terms of hardware implementation and therefore are suited to base station applications and not mobile applications. Further, all of the above techniques are non-trivial in implementation and/or complexity.

Thus, there is a need for a Single Antenna Interference Cancellation (SAIC) solution for reducing the effect of co-channel interfering signals that is suitable for implementation in mobile handsets, is relatively simple to implement, does not have high MIPS consumption and does not significantly increase cost.

SUMMARY OF THE INVENTION

Accordingly, the present invention provides a novel and useful apparatus for and method of single antenna interference cancellation (SAIC) in a wireless communications system. The present invention is suitable for use with a wide range of channels and is particularly useful in reducing the effects of co-channel interference caused by in-band transmissions of other modulation schemes that are received by the mobile handset. A typical application of the SAIC based algorithms provided by the present invention is in systems that reduce co-channel interference such as GMSK modulation in EDGE enabled networks.

To aid in illustrating the principles of the present invention, the apparatus and method are presented in the context of a GSM EDGE mobile station. It is not intended that the scope of the invention be limited to the examples presented herein. One skilled in the art can apply the principles of the present invention to numerous other types of communication systems as well without departing from the scope of the invention.

The present invention provides a novel class of algorithms for Downlink Advanced Receiver Performance (DARP) receivers. The proposed approach is based on a novel metric calculation used during equalization and optionally in other portions of the receiver as well such as the soft value generator. Existing equalizers can be modified to implement the SAIC algorithms of the present invention. In terms of complexity, however, the receiver remains similar to the conventional equalizer employed. In terms of memory, no additional memory is required to construct the trellis based equalizer. In terms of computing resources, however, increased resources are required due to an increase in the complexity of the branch metric model. The required increase in receiver complexity, however, is minimal when compared to the computing requirements of prior art solutions.

In accordance with the invention, the modified metric is adapted to take into account the rotation remaining in the noise component of the received signal after 8PSK de-rotation is applied. Considering the interferer to be a GMSK signal, a key assumption made is that the I/Q elements of the noise are correlated. This known correlation is then used to modify the decision rule for the received signal thus improving the performance of the equalizer. The model is further extended to take into account temporal error correlation.

The scope of this document is to present a DARP receiver for 8PSK EDGE modulation wherein the interfering signals comprise GMSK modulated signals. Note that throughout this document the term GMSK denotes both GSM and GPRS modulation schemes. The solution presented by the present invention is blind and is therefore sufficiently robust for use in many well-known testing scenarios. It is noted that the blind receiver approach taken by the present invention is capable of improving the performance of a reference receiver by 2.5 dB for a static channel and by approximately 1 dB for the TU3 iFH channel. In addition, similar improvements are observed for the case of unsynchronized network testing scenarios. Furthermore, the proposed algorithm does not reduce performance in conventional testing scenarios.

There is therefore provided in accordance with the invention, a method of computing a metric to be used in determining an estimate of a most likely sequence of symbols transmitted over a channel from a plurality of received samples, each received sample comprising an information component and an interference component, the method comprising the steps of estimating an error vector by subtracting the convolution of known training sequence symbols with an estimate of the channel from the plurality of received samples corresponding to the training sequence, estimating a noise correlation matrix by processing real and imaginary components of the error vector, computing a plurality of summations by processing the plurality of received samples, the noise correlation matrix and a plurality of hypotheses of symbols that have been passed through the channel and determining a minimum summation from the plurality of summations resulting in the metric.

There is also provided in accordance with the invention, a method of computing a metric to be used in determining, from a plurality of received samples, an estimate of a most likely sequence of symbols transmitted over a channel, each received sample comprising an information component and an interference component, the method comprising the steps of estimating an error vector by subtracting the convolution of known training sequence symbols with an estimate of the channel from the plurality of received samples corresponding to the training sequence, de-rotating the error vector to generate a de-rotated error vector, estimating a noise correlation matrix by processing real and imaginary components of the de-rotated error vector, computing a rotation compensated noise correlation matrix by processing the noise correlation matrix in accordance with a corresponding sample index, computing a plurality of summations by processing the plurality of received samples, the rotation compensated noise correlation matrix and a plurality of hypotheses of symbols that have been passed through the channel and determining a minimum summation from the plurality of summations resulting in the metric.

There is further provided in accordance with the invention, a method of implementing an equalizer in a radio receiver subjected to co-channel interference, the method comprising the steps of receiving a plurality of received samples, each received sample comprising an information component and an interference component, calculating and assigning a metric to each sequence of symbols to be considered, wherein the step of calculating the metric comprises the steps of estimating an error vector by subtracting the convolution of known training sequence symbols with an estimate of the channel from the plurality of received samples corresponding to the training sequence, de-rotating the error vector to generate a de-rotated error vector, estimating a noise correlation matrix by processing real and imaginary components of the de-rotated error vector, computing a rotation compensated noise correlation matrix by processing the noise correlation matrix in accordance with a corresponding sample index, computing a plurality of summations by processing the plurality of received samples, the rotation compensated noise correlation matrix and a plurality of hypotheses of symbols that have been passed through the channel, determining a minimum summation from the plurality of summations resulting in a lowest metric representing a most likely sequence of symbols transmitted over the channel and removing intersymbol interference introduced by the channel including the co-channel interference utilizing the lowest metric.

There is also provided in accordance with the invention, a computer program product characterized by that upon loading it into computer memory a metric calculation process is executed, the computer program product comprising a computer useable medium having computer readable program code means embodied in the medium for computing a metric to be used in determining an estimate of a most likely sequence of symbols transmitted over a channel from a plurality of received samples, each received sample comprising an information component and an interference component, the computer program product comprising computer readable program code means for estimating an error vector by subtracting the convolution of known training sequence symbols with an estimate of the channel from the plurality of received samples corresponding to the training sequence, computer readable program code means for estimating a noise correlation matrix by processing real and imaginary components of the rotated error vector, computer readable program code means for computing a plurality of summations by processing the plurality of received samples, the noise correlation matrix and a plurality of hypotheses of symbols that have been passed through the channel and computer readable program code means for determining a minimum summation from the plurality of summations resulting in the metric.

There is further provided in accordance with the invention, a radio receiver coupled to a single antenna comprising a radio frequency (RF) receiver front end circuit for receiving a radio signal transmitted over a channel and downconverting the received radio signal to a baseband signal, the received radio signal comprising an information component and an interference component, a demodulator adapted to demodulate the baseband signal in accordance with the modulation scheme used to generate the transmitted radio signal, a channel estimation module adapted to calculate a channel estimate by processing a received training sequence and a known training sequence, an equalizer adapted to remove intersymbol interference introduced by the channel utilizing a metric calculation stage and an estimate of the channel, the metric calculation stage comprising processing means adapted to, estimate an error vector by subtracting the convolution of known training sequence symbols with the estimate of the channel from the plurality of received samples corresponding to the training sequence, estimate a noise correlation matrix by processing real and imaginary components of the =error vector, compute a plurality of summations by processing the plurality of received samples, the noise correlation matrix and a plurality of hypotheses of symbols that have been passed through the channel, determine a minimum summation from the plurality of summations resulting in the metric and a decoder adapted to decode the output of the equalizer to generate output data therefrom.

There is also provided in accordance with the invention, a method of generating soft values from hard symbol decisions output of an equalizer, the method comprising the steps of calculating an error matrix incorporating consideration for I/Q correlation of noise in an interferer signal, estimating an error vector by subtracting the convolution of known training sequence symbols with an estimate of the channel from a plurality of received samples corresponding to the training sequence, estimating a noise correlation matrix by processing real and imaginary components of the error vector, computing a plurality of summations by processing the plurality of received samples, the noise correlation matrix and a plurality of hypotheses of symbols that have been passed through the channel, determining a minimum summation from the plurality of summations resulting in an error metric, determining a conditional probability of the plurality of received samples given the hard symbol decision sequence and calculating log likelihood ratio (LLR) of the conditional probability to yield the soft decision values.

BRIEF DESCRIPTION OF THE DRAWINGS

The invention is herein described, by way of example only, with reference to the accompanying drawings, wherein:

FIGS. 8A through 8H are diagrams illustrating the decision regions for rotated correlation matrices;

DETAILED DESCRIPTION OF THE INVENTION

Notation Used Throughout

Figure 1:
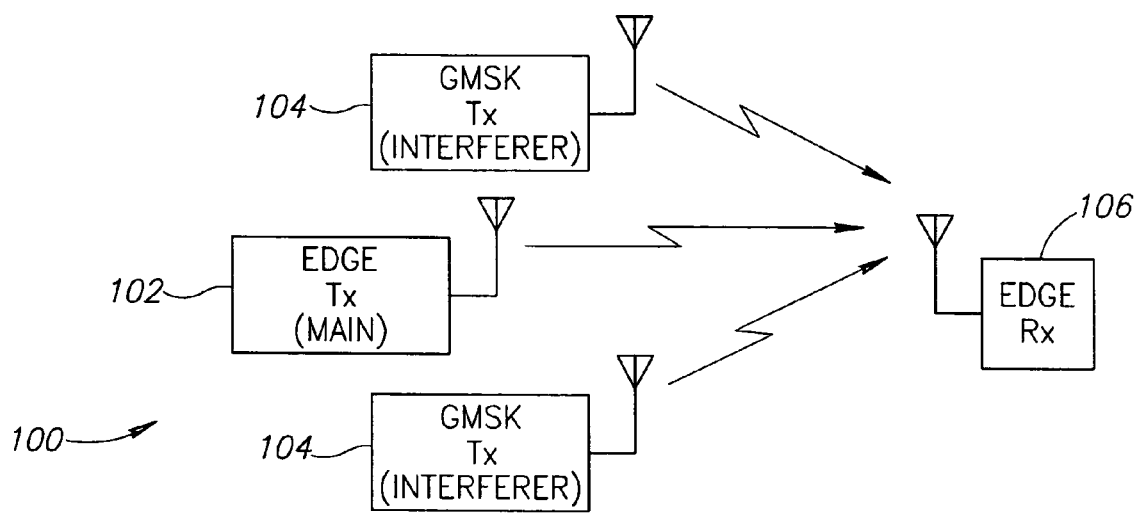
FIG. 1 is a diagram illustrating an example cellular network including a plurality of EDGE transmitters and receivers and GMSK transmitters generating co-channel interference.

The following notation is used throughout this document.

| Term | Definition |
| --- | --- |
| 8PSK | 8 Phase Shift Keying |
| AMPS | Advanced Mobile Telephone System |
| AR | Autoregressive |
| ASIC | Application Specific Integrated Circuit |
| AWGN | Additive White Gaussian Noise |
| BLER | Block Error Rate |
| BPSK | Binary Phase Shift Keying |
| CDMA | Code Division Multiple Access |
| CD-ROM | Compact Disc Read Only Memory |
| CPU | Central Processing Unit |
| CRC | Cyclic Redundancy Check |
| DFE | Decision Feedback Equalizer |
| DSL | Digital Subscriber Line |
| DSP | Digital Signal Processor |
| EDGE | Enhanced Data for Global Evolution |
| EEROM | Electrically Erasable Read Only Memory |
| EGPRS | Enhanced General Packet Radio System |
| FEC | Forward Error Correction |
| FIR | Finite Impulse Response |
| FPGA | Field Programmable Gate Array |
| FTP | File Transfer Protocol |
| GERAN | GSM EDGE Radio Access Network |
| GMSK | Gaussian Minimum Shift Keying |
| GPRS | General Packet Radio System |
| GSM | Global System for Mobile Communication |
| HTTP | Hyper Text Transport Protocol |
| IID | Independent and Identically Distributed |
| ISDN | Integrated Services Digital Network |
| ISI | Intersymbol Interference |
| LLR | Log Likelihood Ratio |
| MAN | Metropolitan Area Network |
| MED | Minimum Euclidian Distance |
| MIPS | Millions of Instructions Per Second |
| MLSE | Maximum Likelihood Sequence Estimation |
| MMSE | Minimum Mean Square Error |
| MSE | Mean Squared Error |
| PDF | Probability Density Function |
| PSK | Phase Shift Keying |
| PSP | Per Survivor Processing |
| QAM | Quadrature Amplitude Modulation |
| RF | Radio Frequency |
| ROM | Read Only Memory |
| SAIC | Single Antenna Interference Cancellation |
| SER | Symbol Error Rate |
| SNR | Signal to Noise Ration |
| SVG | Soft Value Generator |
| TACS | Total Access Communications Systems |
| TDMA | Time Division Multiple Access |
| TSC | Training Sequence |
| UMTS | Universal Mobile Telecommunications System |
| UWB | Ultrawideband |
| VA | Viterbi Algorithm |
| WCDMA | Wideband Code Division Multiple Access |
| WiMAX | Worldwide Interoperability for Microwave Access |
| WLAN | Wireless Local Area Network |
| WLL | Wireless Local Loop |
| WMF | Whitening Matched Filter |

DETAILED DESCRIPTION OF THE INVENTION

The present invention is an apparatus for and method of single antenna interference cancellation (SAIC) for used in a wireless communications system. Examples of wireless communications systems include cordless telephony and cellular communications systems. Examples of cellular communications systems include global systems for mobile communications (GSM), CDMA, TDMA, etc. The present invention is suitable for use with a wide range of channels and is particular useful in reducing the effects of co-channel interference caused by in-band transmissions of other modulation schemes that are received by the mobile handset. A typical application of the SAIC based algorithms provided by the present invention is with reducing co-channel interference such as GMSK modulation in EDGE enabled networks.

To aid in illustrating the principles of the present invention, the apparatus and method are presented in the context of a GSM EDGE mobile station. It is not intended that the scope of the invention be limited to the examples presented herein. One skilled in the art can apply the principles of the present invention to numerous other types of communication systems as well without departing from the scope of the invention.

Note that the receiver configuration presented herein is intended for illustration purposes only and is not meant to limit the scope of the present invention. It is appreciated that one skilled in the communication and signal processing arts can apply the SAIC algorithms and modified metrics of the present invention to numerous other receiver topologies and communication schemes as well.

Received Signal Model

The invention assumes the following model for received signals. Consider an 8PSK modulated (i.e.

$$\frac{3\pi}{8}$$

rotated) received signal with a coexisting combination of GMSK interfering signal as follows:

$$y_i = \sum_{k=0}^{L-1} h_k x_{i-k} + \sum_{k=0}^{L_g-1} g_k x_{i-k}^{co} + \sqrt{\frac{N_0}{2}} n_i \quad (1)$$

where
$y_i$ represents the received signal samples;
L denotes the channel order (or length in sampling time units);
$h_k$ represents the channel taps of the signal of interest;
$g_k$ represents the channel taps of the interfering signal;
$x_i$ denotes the transmitted symbols (8PSK after de-rotation);
$x^{co}$ denotes the co-channel, offset rotated, symbols;

Accordingly, $L_g$, denotes the co-channel interference channel-order with channel taps $g_k$. The noise sequence, denoted $n_i$, is a zero-mean unit-variance independent and identically distributed (IID) sequence. Note that the noise probability density function (PDF) is circularly-symmetric complex-normal random variables (i.e., $n_i \sim CN(0, I_{2 \times 2})$). N denotes the additive white Gaussian noise (i.e., $n_i$ AWGN) single sided power spectral density. In this model we assume that $x^{co}$ is a rotated GMSK modulated signal. The $$\frac{3\pi}{8}$$

de-rotation of the 8PSK signal results in a marginal rotation of $$\frac{\pi}{8}$$

for the co-channel interference. The assumption of the interfering signal may be easily extended for 8PSK signals as well. As is described infra in the interference reduction algorithm description many aspects of the blind solution formulation may also be advanced for the GMSK/GMSK scenario.

Example EDGE Receiver

Figure 2:
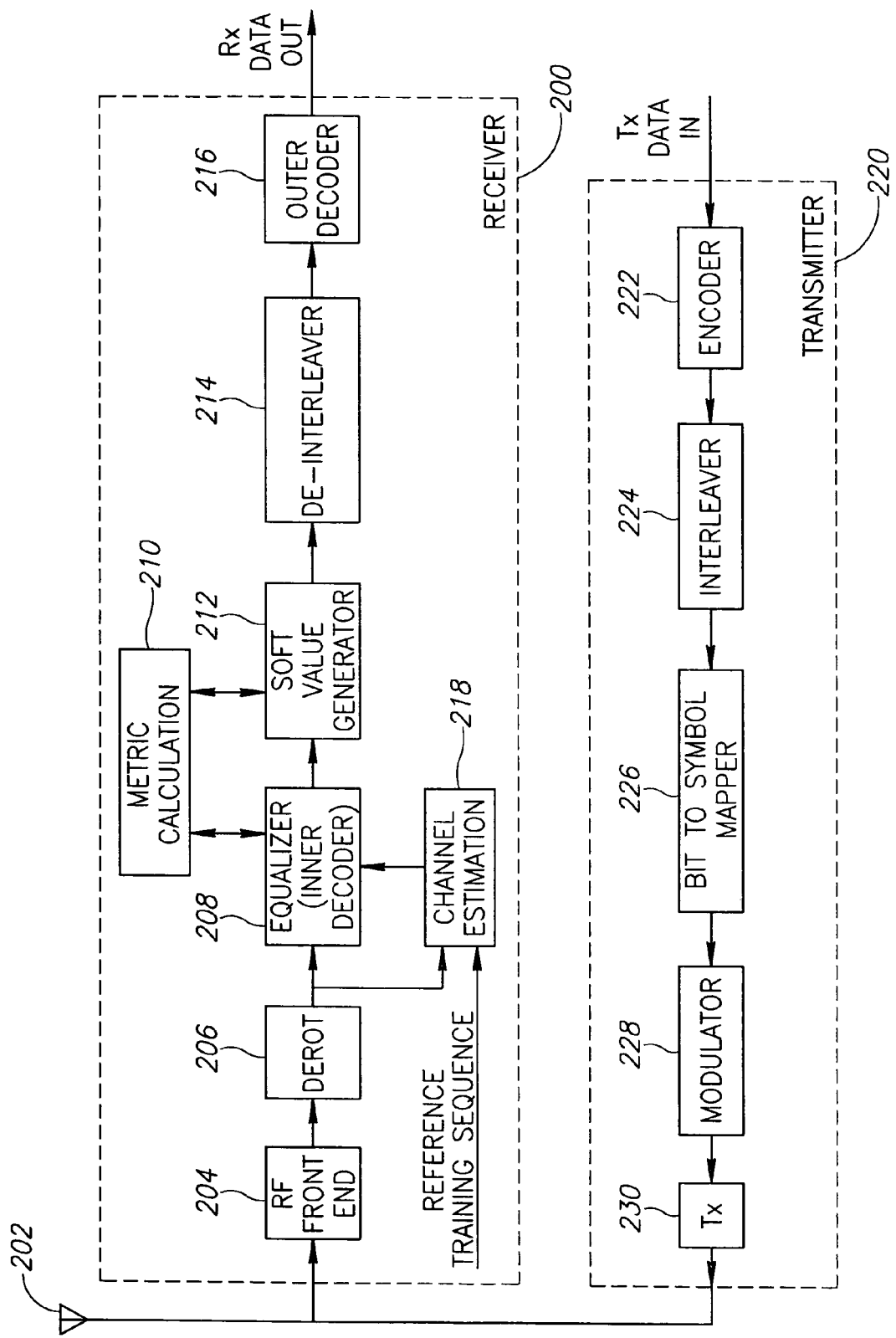
FIG. 2 is a block diagram illustrating an example EDGE transceiver constructed in accordance with the present invention.

A block diagram illustrating an example EDGE transceiver constructed in accordance with the present invention is shown in FIG. 2. The communications transceiver, generally referenced 200, is coupled to an antenna 202 and comprises a transmitter 220 and receiver 240. The receiver 240 comprises an RF front-end 204, demodulator (de-rotator) 206, channel estimation 218, equalizer (i.e. inner decoder) 208, soft value generator 212, metric calculation 210, de-interleaver 214 and outer decoder 216. The signal supplied by the antenna is sent through from channel from the transmitter 102 FIG. 1). The concatenated encoder transmitter 220, for example, comprises an encoder 222, interleaver 224, bit to symbol mapper 226, modulator 228 and transmit circuit 230.

In the transmitter, input data bits to be transmitted are input to the encoder 222 which may comprise an error correction encoder such as Reed Solomon, convolutional encoder, parity bit generator, etc. The encoder functions to add redundancy bits to enable errors in transmission to be located and fixed.

The bits output of the encoder are then input to the interleaver 224 which functions to rearrange the order of the bits in order to more effectively combat error bursts in the channel. The bits output of the interleaver are then mapped to symbols by the symbol mapper 226. The bit to symbol mapper functions to transform bits to modulator symbols from an M-ary alphabet. For example, an 8PSK modulator converts input bits into one of eight symbols. Thus, the mapper in this case generates a symbol for every three input bits.

The symbols output from the mapper are input to the modulator 228 which functions to receive symbols in the M-ary alphabet and to generate an analog signal therefrom. The transmit circuit 230 filters and amplifies this signal before transmitting it over the channel. The transmit circuit comprises coupling circuitry required to optimally interface the signal to the channel medium.

The channel may comprise a mobile wireless channel, e.g., cellular, cordless, fixed wireless channel, e.g., satellite, or may comprise a wired channel, e.g., xDSL, ISDN, Ethernet, etc. It is assumed that AWGN and co-channel interference generated by adjacent GMSK transmitters are present which is added to the signal in the channel. The transmitter is adapted to generate a signal that can be transmitted over the channel so as to provide robust, error free detection by the receiver.

It is noted that both the inner and outer decoders in the receiver have complimentary encoders in the system. The outer encoder in the system comprises the encoder, e.g., convolutional, etc. The inner encoder comprises the channel itself, which in one embodiment can be modeled as an L-symbol long FIR-type channel.

At the receiver, the analog signal from the channel is input to RF front end circuitry 204 via antenna 202. The front-end circuitry and demodulator function to downconvert and sample the received signal to generate received samples at the symbol rate. Assuming a receiver adapted to receive an EDGE modulated signal, the samples comprising a complete burst are collected and subsequently split into training sequence samples and data samples. The data samples are input to the equalizer 208 while the training sequence samples are input to a channel estimation module 218 which functions to calculate a channel estimate that is input to the equalizer. The channel estimate is generated using the received training sequence samples and the known or reference training sequence.

Several methods of channel estimation and channel order selection are known in the art and suitable for use with the present invention include, for example U.S. Pat. No. 6,907, 092, entitled Method Of Channel Order Selection And Channel Estimation In A Wireless Communication "System," incorporated herein by reference in its entirety.

The inner decoder (i.e. the equalizer) is operative to generate decisions from the data samples. An example of an inner decoder is an equalizer which compensates for the ISI caused by the delay and time spreading of the channel. The function of the equalizer is to attempt to detect the symbols that were originally transmitted by the modulator. The equalizer is adapted to output symbol decisions and may comprise, for example the well known maximum likelihood sequence estimation (MLSE) based equalizer that utilizes the well known Viterbi Algorithm (VA), linear equalizer or decision feedback equalizer (DFE).

Most communication systems must combat a problem known as Intersymbol Interference (ISI). Ideally, a transmitted symbol should arrive at the receiver undistorted, possibly attenuated greatly and occupying only its time interval. In reality, however, this is rarely the case and the received symbols are subject to ISI. Intersymbol interference occurs when one symbol is distorted sufficiently that is occupies time intervals of other symbols.

The situation is made even worse in GSM communications systems as the GSM transmitter contributes its own ISI due to controlled and deliberate ISI from the transmitter's partial response modulator. The effects of ISI are influenced by the modulation scheme and the signaling techniques used in the radio.

Equalization is a well known technique used to combat intersymbol interference whereby the receiver attempts to compensate for the effects of the channel on the transmitted symbols. An equalizer attempts to determine the transmitted data from the received distorted symbols using an estimate of the channel that caused the distortions. In communications systems where ISI arises due to partial response modulation or a frequency selective channel, a maximum likelihood sequence estimation (MLSE) equalizer is optimal. This is the form of equalizer generally used in GSM, EDGE and GERAN systems.

The MLSE technique is a nonlinear equalization technique which is applicable when the radio channel can be modeled as a Finite Impulse Response (FIR) system. Such a FIR system requires knowledge of the channel impulse response tap values. As described supra, the channel estimate is obtained using a known training symbol sequence to estimate the channel impulse response. Other equalization techniques such as DFE or linear equalization require precise knowledge of channel.

There exist other equalization techniques such as Decision Feedback Equalization (DFE) or linear equalization. All these equalization techniques require precise knowledge of channel.

In GSM, the training sequence is sent in the middle of each burst. As Each fixed length burst consists of 142 symbols preceded by 3 tail symbols and followed by 3 tail symbols and 8.25 guard symbols. The 142 symbols include a 58 symbol data portion, 26 symbol training sequence and another 58 symbol data portion. Since the training sequence is sent in the middle of the burst, it is referred to as a midamble. It is inserted in the middle of the burst in order to minimize the maximum distance to a data bit thus minimizing the time varying effects at the ends of the burst.

The training sequences comprise sequences of symbols generated to yield good autocorrelation properties. The receiver control algorithm uses the training sequence, received in the presence of ISI, to determine the characteristics of the channel that would have generated the symbols actually received. GSM uses eight different training sequences whereby the autocorrelation of each results in a central peak surrounded by zeros. The channel impulse response can be measured by correlating the stored training sequence with the received sequence.

The MLSE equalizer (also called a Viterbi equalizer) uses the Viterbi algorithm along with inputs and an estimate of the channel to extract the data. The equalizer generates a model of the radio transmission channel and uses this model in determining the most likely sequence. An estimate of the transfer function of the channel is required by the MLSE equalizer in order to be able to compensate for the channel ISI effect.

The MLSE equalizer operates by scanning all possible data sequences that could have been transmitted, computing the corresponding receiver input sequences, comparing them with the actual input sequences received by computing the modified metric of the present invention in accordance with the parameters and selects the sequence yielding the highest likelihood of being transmitted. Considering that ISI can be viewed as unintentional coding by the channel, the Viterbi algorithm used in the MLSE equalizer can be effective not only in decoding convolutional code sequences but in combating ISI. Typically, the MLSE equalizer comprises a matched filter (i.e. FIR filter) having L taps coupled to a Viterbi processor. The output of the equalizer is input to the Viterbi processor which finds the most likely data sequence transmitted.

The channel estimate is used by the equalizer in processing the data blocks on either side of the training sequence midamble. A tracking module may be used to improve the performance of the receiver. If a tracking module is employed, the equalizer is operative to use the initial channel estimate in generating hard decisions for the first block of data samples. Decisions for subsequent data blocks are generated using updated channel estimates provided by the tracking module. The equalizer is also operative to generate preliminary decisions which are used by the tracking module in computing the recursive equations for the updated channel estimate.

The output of the equalizer comprises hard symbol decisions. The hard decisions are then input to the soft value generator 212 which is operative to output soft decision information given (1) hard symbol decisions from the inner decoder, (2) channel model information h(k), and (3) the input samples received from the channel.

The soft decision information for a symbol is derived by determining the conditional probability of the input sample sequence given the hard symbol decision sequence. The soft decision is calculated in the form of the log likelihood ratio (LLR) of the conditional probability. The noise variance of the channel also used by the soft value generator in generating the soft information. A soft symbol generator suitable for use with the present invention is described in more detail in U.S. Pat. No. 6,731,700, entitled "Soft Decision Output Generator," incorporated herein by reference in its entirety.

The log likelihood ratio is defined as the ratio of the probability of a first symbol with a second symbol wherein the second symbol is a reference symbol. The reference symbol is arbitrary as long as it is used consistently for all the soft output values for a particular time k. The reference symbol can, however, vary from time k+1, k+2, etc. Preferably, however, the reference is kept the same throughout.

Note that a hard decision is one of the possible values a symbol can take. In the ideal case, a soft decision comprises the reliabilities of each possible symbol value. The soft decision comprises a complete information packet that is needed by the decoder. An information packet is defined as the output generated by a detector or decoder in a single operation.

The soft decision information output of the soft value generator is input to the outer decoder 216 which is preferably an optimal soft decoder. The outer decoder functions to detect and fix errors using the redundancy bits inserted by the encoder and to generate the binary receive data. Examples of the outer decoder include convolutional decoders utilizing the Viterbi Algorithm, convolutional Forward Error Correction (FEC) decoders, turbo decoders, etc. Soft input Viterbi decoders have the advantage of efficiently processing soft decision information and providing optimum performance in the sense of minimum sequence error probability.

Note that optionally, a de-interleaver 214 may be used in the receiver (and correspondingly in the transmitter). In this case, a symbol based interleaver/de-interleaver is used to reconstruct the original order of the data input to the transmitter. If a bit based interleaver/de-interleaver is used, a mechanism of mapping soft symbols to bits must be used before the outer decoder, such as described in U.S. Pat. No. 6,944,242, entitled "Apparatus For And Method Of Converting Soft Symbol Information To Soft Bit Information," incorporated herein by reference in its entirety.

Error Metric Modification (De-correlation)

As described supra, the objective of the equalizer is to find the most likely sequence of transmitted symbols, given a buffer of received symbols. This well-known process is referred to as Maximum Likelihood Sequence Estimation (MLSE). In order to select the best sequence, the equalizer essentially assigns a metric to each sequence. After computing the metric for all sequences, it selects the sequence having the lowest metric. The MLSE is formally given by:

$$\hat{\underline{x}} = \arg\max_{\underline{x}} \{Pr(\underline{y}|\underline{x})\}. \qquad (2)$$

where
  $\underline{y}$ denotes the received signal buffer;
  $\hat{\underline{x}}$ denotes the estimated sequence of symbols;

An equalizer employing Equation 2 above results in an estimate of a transmitted sequence of symbols which is most likely. This makes such an equalizer an efficient estimator. The conditional probability shown in the equation, however, is unknown. A common assumption for calculating the conditional probability is that the noise is Additive White Gaussian Noise (AWGN). In the case of GMSK co-channel interferers, however, any assumption about the noise must take the GMSK transmitters into account. In accordance with the present invention, an extended model for calculating this probability, and thus improving the equalizer's performance, is presented herein.

Metric Calculation and Decision Regions

For the AWGN channel, the probability distribution function of the noise is given by $$f_N(n) = \frac{1}{2\pi\sigma^2} \exp\left[-\frac{|n|^2}{2\sigma^2}\right] \quad (3)$$

$$= \frac{1}{\sqrt{2\pi\sigma^2}} \exp\left[-\frac{\mathcal{R}(n)^2}{2\sigma^2}\right] \frac{1}{\sqrt{2\pi\sigma^2}} \exp\left[-\frac{\mathcal{J}(n)^2}{2\sigma^2}\right]$$

where $\mathcal{R}(n)$ and $\mathcal{J}(n)$ denote the real and imaginary parts of a complex argument, respectively.

In other words, the noise is a complex Gaussian random variable with independent components, each with a Gaussian distribution with zero expectation and variance of a $\sigma^2$. The conditional probability for the MLSE is given as:

$$Pr(\underline{y}|\underline{x}) = Pr(\underline{y}|\underline{h}*\underline{x}) \quad (4)$$

$$= Pr(\underline{y}|\underline{x}^h)$$

$$= \prod_i Pr(y_i|x_i^h)$$

$$= \prod_i \frac{1}{2\pi\sigma^2} \exp\left[\frac{|y_i - x_i^h|^2}{2\sigma^2}\right]$$

where $\underline{x}^h = \underline{h}*\underline{x}$ is the vector of symbols $\underline{x}$ after passing through the channel $\underline{h}$, and * represents the convolution operator.

When taking the argmax, Equation 4 above can be simplified to the following:

$$\hat{\underline{x}} = \arg\max\left\{\prod_i \frac{1}{2\pi\sigma^2} \exp\left[\frac{|y_i - x_i^h|^2}{2\sigma^2}\right]\right\} \quad (5)$$

$$= \arg\max\left\{\prod_i \exp\left[\frac{|y_i - x_i^h|^2}{2\sigma^2}\right]\right\}$$

$$= \arg\max\left\{\sum_i -\frac{|y_i - x_i^h|^2}{2\sigma^2}\right\}$$

$$= \arg\min\left\{\sum_i |y_i - x_i^h|^2\right\}$$

$$= \arg\min\{\|\underline{y} - \underline{x}^h\|\}$$

which leads to the well-known Minimum Euclidian Distance (MED) criterion. Note that calculating the metric for a given sequence does not require knowing the noise variance $\sigma^2$.

Figure 3:
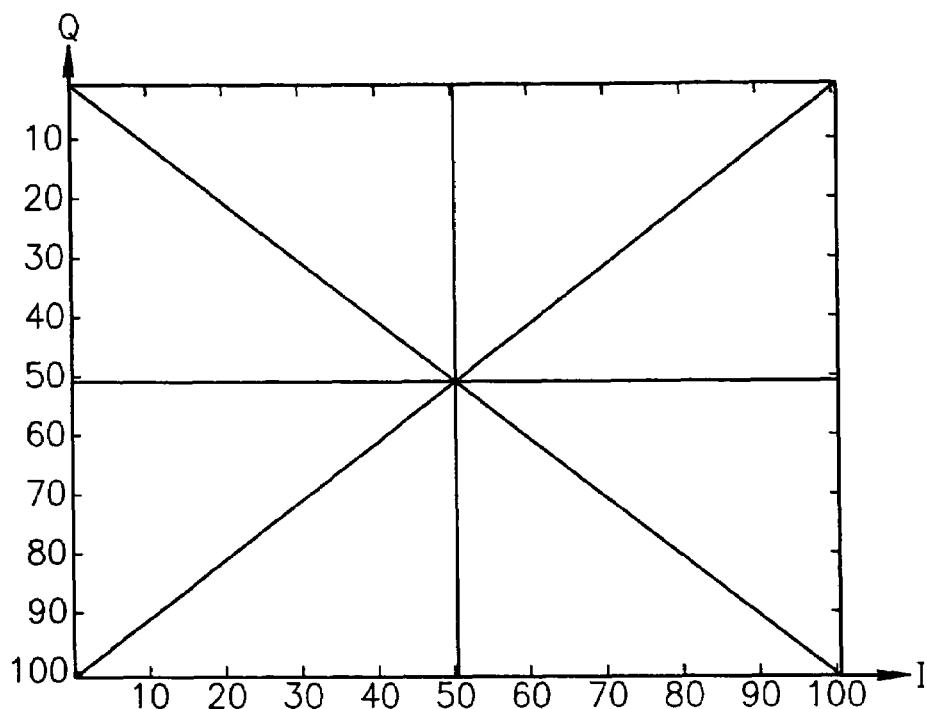
FIG. 3 is a diagram illustrating the decision regions for Minimum Euclidian Distance (MED) criterion.

Every decision criterion imposes a division of the I/Q plane into eight (for 8PSK) decision regions, i.e. a mapping of every point on the I/Q plane to one of the eight symbols. The decision regions for the MED criterion are illustrated in FIG. 3. Note that the regions are symmetric and evenly distributed around the origin with equal angles, distances, etc. due to the assumption of white noise thereby resulting in a square metric.

I/Q Correlated Noise

It is important to note that choosing the channel noise model to be Gaussian with independent components may be convenient, but this is not always the correct model. If the I and Q elements are correlated, as is the case with GMSK interferers, it is possible to use this correlation to modify the decision rule, and improve the performance of the equalizer.

For defining the extended model, we mark the (complex) samples as vectors of 2 real elements:

$$x = \begin{pmatrix} x^R \\ x^I \end{pmatrix} \quad (6)$$

The probability distribution function of the noise is now defined by the following:

$$f_N(n) = \frac{1}{2\pi\sqrt{\|\Lambda\|}} \exp\left[-\frac{1}{2} n^T \Lambda^{-1} n\right], \text{ where } \Lambda \quad (7)$$

$$= E(n \cdot n^T)$$

$$= E\left(\begin{bmatrix} (n^R)^2 & n^R n^I \\ n^R n^I & (n^I)^2 \end{bmatrix}\right)$$

where $\|\cdot\|$ denotes the determinant of the matrix in the argument. The noise presented above has the form of a Gaussian random vector with real components which are possibly dependent. Each element in the noise vector obeys the zero mean Gaussian distribution law. Note that this model extends the previous model of Equation 3, which can be achieved by the following substitution:

$$\Lambda = \begin{bmatrix} \sigma^2 & 0 \\ 0 & \sigma^2 \end{bmatrix}. \quad (8)$$

Using notation similar to the previous model, we get the following MLSE equation:

$$\hat{\underline{x}} = \arg\max\{Pr(\underline{y}|\underline{x})\} \quad (9)$$

$$= \arg\max\left\{\prod_i Pr(\underline{y}_i|x_i^h)\right\}$$

$$= \arg\max\left\{\prod_i \frac{1}{2\pi\sqrt{\|\Lambda\|}} \exp\left[-\frac{1}{2}(y_i - x_i^h)^T \Lambda^{-1}(y_i - x_i^h)\right]\right\}$$

$$= \operatorname{argmin}\left\{\sum_i (y_i - x_i^h)^T \Lambda^{-1} (y_i - x_i^h)\right\}$$

In the case the noise is not correlated, Equation 9 collapses to the previous metric of Equation 5.

Calculating the new metric requires knowledge of the noise covariance matrix $\Lambda$, which needs to be estimated, as described in more detail infra. To illustrate the effect of an existing cross-correlation between in-phase and quadrature components of the noise, let us use for example the following covariance matrix $$\Lambda = \begin{bmatrix} 1 & .3 \\ .3 & 1 \end{bmatrix}.$$

Figure 4:
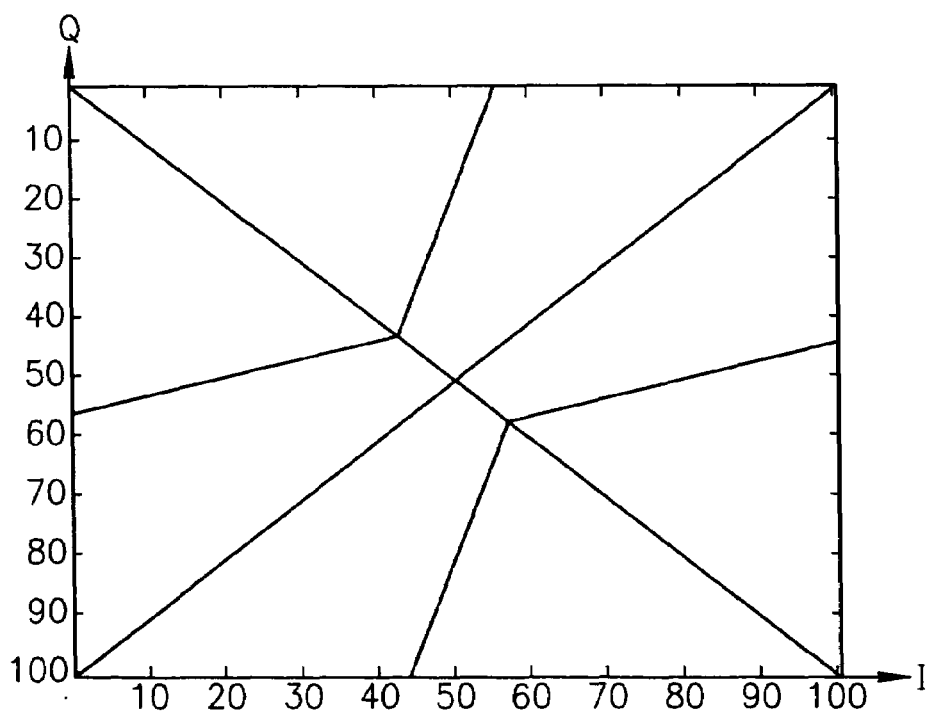
FIG. 4 is a diagram illustrating the decision regions for Minimum Euclidian Distance (MED) criterion with I/Q correlated noise.

The decision regions for the new decision rule which corresponds to this example $\Lambda$ is shown in FIG. 4.

It is interesting to note that unlike the circular symmetric case where each decision region is bounded by only two straight lines the I/Q correlated scenario presented in FIG. 4 comprises few regions bounded by three lines. Note also that another effect produced by the correlation of the noise is that the error rate for different symbols in the constellation may now differ.

Rotation and Relation to Interference Cancellation

One assumption of the present invention is that the main (i.e. desired) signal is 8PSK, $3\pi/8$ rotated while the interferer signal is GMSK modulated with $\pi/2$ rotation. Adding signals of GMSK type and $3\pi/8$ shifted 8PSK results in a relative shift of $\pi/8$ rotation between the main signal and the interferer signal. In order to model the GMSK interferer as correlated Gaussian noise, it is necessary to 'rotate' the interferer correlation correspondingly (i.e. $\pi/8$ offset rotation).

Figure 5:
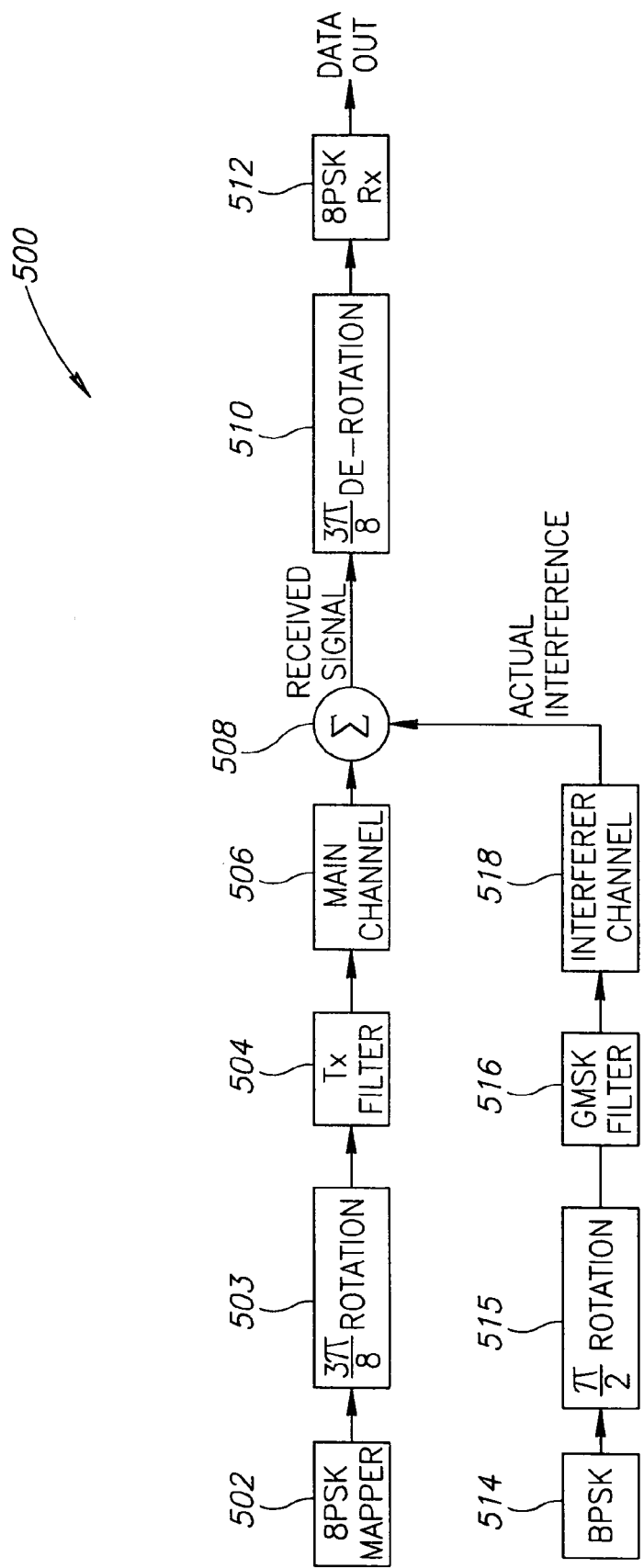
FIG. 5 is a diagram illustrating modeling an 8PSK signal with a BPSK interfering signal.
Figure 6:
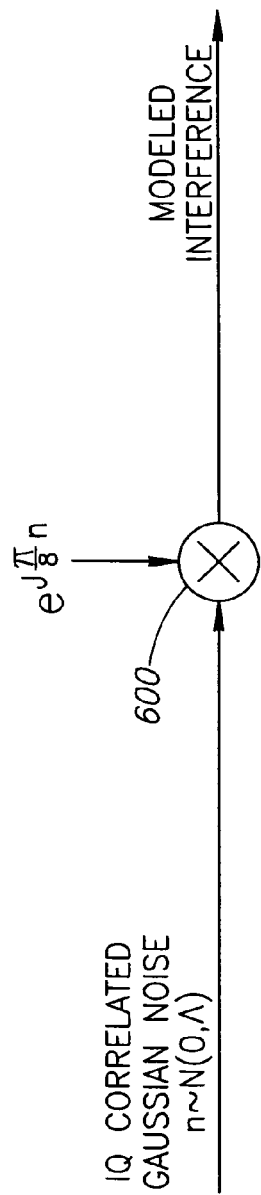
FIG. 6 is a diagram illustrating modeling of a GMSK interferer as rotated I/Q correlated noise.

The model is shown graphically in FIGS. 5 and 6. FIG. 5 is a diagram illustrating modeling an 8PSK signal with a BPSK interfering signal. In the model, generally referenced 500, an 8PSK transmitter 502 generates an 8PSK signal to which a $3\pi/8$ rotation is applied 504. A GMSK transmitter 514 generates a BPSK signal to which an effective $\pi/2$ rotation is applied 516. The signal from the main channel 506 and interferer channel 518 are combined 508 and the combined received signal undergoes de-rotation 510 before being input to the 8PSK receiver 512. Note that upon receiving the buffer of received samples, the receiver de-rotates the samples by a factor of $3\pi/8$ in order to remove any rotation in the main signal. The interferer remains, however, rotated by a factor of $\pi/8$. This rotation must be considered both in estimating the correlation matrix and throughout the metric calculation process. Note also that although the model fits best if the interferer channel is ordered in the same direction (i.e. all elements of the FIR filter have the same phase), it is still superior to the simpler assumption of uncorrelated Gaussian noise. FIG. 6 is a diagram illustrating modeling of a GMSK interferer as rotated I/Q correlated noise. The I/Q correlated Gaussian noise is rotated by $\pi/8$ to yield the modeled interference.

It is important to note that although the invention is described in the context of a GMSK interferer, it is appreciated that the metric modification described herein can be applied to other types of interferers, such as BPSK, QAM, or any interferer modulation exhibiting correlation in the I/Q plane, without departing from the scope of the invention.

Estimating the Correlation Matrix

Figure 7:
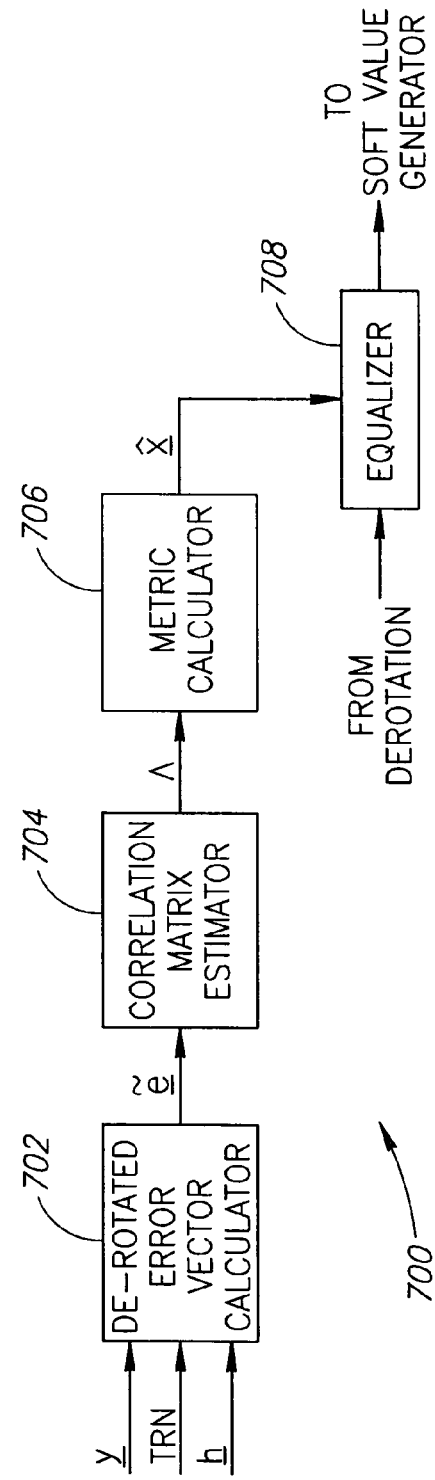
FIG. 7 is a block diagram illustrating an error vector calculation apparatus as contemplated by the present invention used in canceling co-channel interference.

A block diagram illustrating an error vector calculation apparatus as contemplated by the present invention used in canceling co-channel interference is shown in FIG. 7. The block diagram depicts the metric calculation portion of a receiver, generally referenced 700, and comprises a de-rotated error vector calculator 702, correlation matrix estimator 704 and metric calculator 706. The resultant metric $\hat{x}$ is used by the equalizer 708 in determining the most likely sequence of symbols transmitted. Note that blocks 702, 704, 706 may be implemented within the equalizer or as a module external thereto.

The correlation matrix is estimated from an error vector. The error vector is estimated by subtracting the convolution of the known training sequence (TSC) symbols with the estimate of the channel from the original received samples corresponding to the training sequence. This is expressed by the following:

$$\underline{e} = \underline{y} - TRN * \underline{h} \tag{10}$$

wherein
  $\underline{e}$ denotes the error vector;
  $\underline{y}$ denotes the mid portion of the received buffer;
  TRN represents the known training sequence;
  $\underline{h}$ represents the estimated channel parameters vector;

Note that according to the model, the error vector $\underline{e}$ comprises samples of the rotated Gaussian random vector n, and hence needs to be de-rotated. In addition, the particular channel estimation $\underline{h}$ used is not critical to the invention. The de-rotated error vector $\underline{\tilde{e}}$ is defined as follows:

$$\tilde{e}_n = e_n \cdot \exp\left(-j\frac{\pi}{8}n\right) \tag{11}$$

The de-rotated error vector $\underline{\tilde{e}}$ is a vector of samples of the random vector n, and the estimation of $$\Lambda = E\left(\begin{bmatrix} (n^R)^2 & n^R n^I \\ n^R n^I & (n^I)^2 \end{bmatrix}\right)$$

can be done in a straight-forward fashion by averaging:

$$\Lambda_{11} = E((n^R)^2) \approx \frac{1}{N-1} \operatorname{Re}(\tilde{e})^T \cdot \operatorname{Re}(\tilde{e}) \tag{12}$$

$$\Lambda_{22} = E((n^I)^2) \approx \frac{1}{N-1} \operatorname{Im}(\tilde{e})^T \cdot \operatorname{Im}(\tilde{e}) \tag{13}$$

$$\Lambda_{12} = \Lambda_{21} = E(n^R n^I) \approx \frac{1}{N-1} \operatorname{Re}(\tilde{e})^T \cdot \operatorname{Im}(\tilde{e}) \tag{14}$$

where N is the length of $\underline{\tilde{e}}$.

Determining the Correct Correlation Matrix

The expression for the MLSE shown above in Equation 9 assumes that the additive noise has a given correlation matrix which remains constant over time. In the modified model of the present invention which includes a rotation factor, the correlation of the noise in each received sample depends on the particular sample index, as follows:

For sample k, the additive noise is expressed as $$n_k = n \cdot \exp\left(j\frac{\pi k}{8}\right) \quad (15)$$

For a vector representation of the noise (noted by a bold n), the noise $n_k$ and the correlation are given by the following $$n_k = \begin{bmatrix} \text{Re}(n_k) \\ \text{Im}(n_k) \end{bmatrix} \quad (16)$$

$$= \begin{bmatrix} \cos\left(\frac{\pi k}{8}\right) & -\sin\left(\frac{\pi k}{8}\right) \\ \sin\left(\frac{\pi k}{8}\right) & \cos\left(\frac{\pi k}{8}\right) \end{bmatrix} \cdot n \triangleq \Phi_k \cdot n$$

$$\Lambda_k = E(n_k \cdot n_k^T) \quad (17)$$
$$= E(\Phi_k n \cdot (\Phi_k n)^T)$$
$$= E(\Phi_k n \cdot n^T \Phi_k^T)$$
$$= \Phi_k E(n \cdot n^T)\Phi_k^T$$
$$= \Phi_k \Lambda \Phi_k^T$$

where
- $\Lambda_k$ is the time varying correlation matrix for a correlated signal after rotation;
- $\Lambda$ is the correlation matrix before rotation;
- $\Phi_k$ is the rotation matrix;

Therefore, for the sample at time k, the correlation matrix for the calculation of the metric should be $\Lambda_k = \Phi_k \Lambda \Phi_k^T$ and not the original $\Lambda$ described supra. The extension to the model presented here results in a corrected version of the MLSE equations presented above, as:

$$\hat{\underline{x}} = \text{argmin}\left\{\sum_k (y_k - x_k^h)^T \Lambda_k^{-1}(y_k - x_k^h)\right\} \quad (18)$$

The following is used to calculate the metric of an equalization error at time k:

$$\text{Metric} = n^T \cdot \Lambda^{-1} \cdot n \quad (19)$$
$$= (\Phi_k^T \Phi_k n)^T \Lambda^{-1}(\Phi_k^T \Phi_k n_k)$$
$$= (\Phi_k n)^T \Phi_k \Lambda^{-1} \Phi_k^T (\Phi_k n_k)$$
$$= (\Phi_k n)^T \Lambda_k^{-1}(\Phi_k n_k)$$
$$= n_k^T \Lambda_k^{-1} n_k$$

One may observe that the model correction proposed here is expressed in terms of a time varying correlation matrix denoted by $\Lambda_k$. The decision regions for rotated correlation matrices $\Lambda = \Lambda_0$ and its rotations $\Lambda_k$ for k=0, 1, ..., 7 are shown in FIGS. 8A through 8H, respectively.

Performance Gain

Simple simulations (i.e. additive noise, single-tap channel) show the average gain achieved from using the correct correlation matrix. In the presented simulation we select noise correlation matrices of the form $$\Lambda = \begin{bmatrix} 1 & \varepsilon \\ \varepsilon & 1 \end{bmatrix};$$

where $\varepsilon \sim U[0,1]$. In addition, the correlation matrices are rotated in an angle chosen uniformly from $$\left\{0, \frac{\pi}{8}, \frac{2\pi}{8}, \ldots, \frac{7\pi}{8}\right\}.$$

Figure 9:
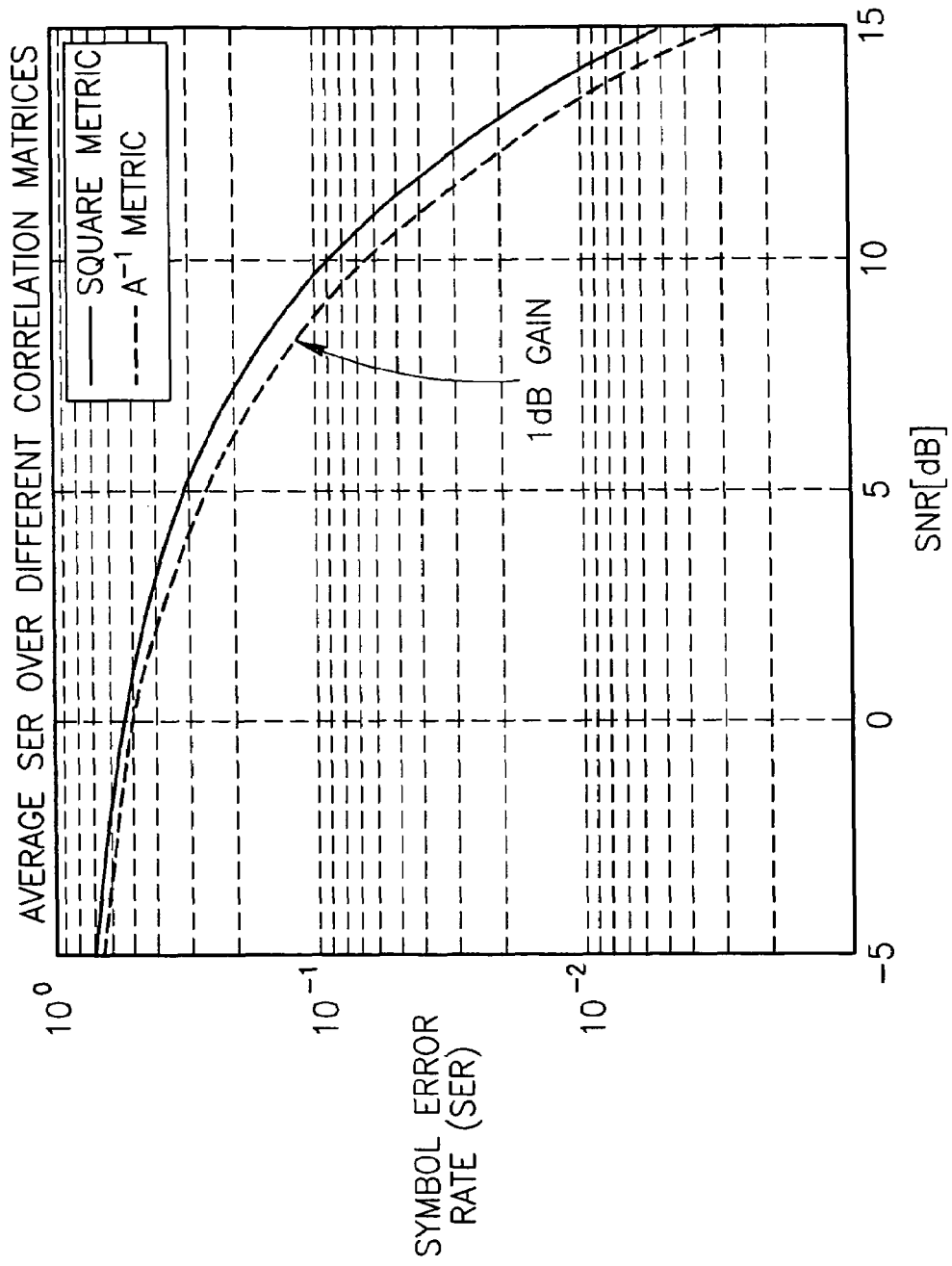
FIG. 9 is a graph illustrating symbol error rate (SER) versus SNR when using the correct correlation matrix for correlated noise.

The simulation results are shown in FIG. 9 which is a graph illustrating symbol error rate (SER) versus SNR when using the correct correlation matrix for correlated noise.

Implementation Notes

Considering the following characteristic of the rotation matrix:

$$\Phi_{k+8} = \begin{bmatrix} \cos\left(\frac{\pi(k+8)}{8}\right) & -\sin\left(\frac{\pi(k+8)}{8}\right) \\ \sin\left(\frac{\pi(k+8)}{8}\right) & \cos\left(\frac{\pi(k+8)}{8}\right) \end{bmatrix} \quad (20)$$

$$= \begin{bmatrix} \cos\left(\frac{\pi k}{8} + \pi\right) & -\sin\left(\frac{\pi k}{8} + \pi\right) \\ \sin\left(\frac{\pi k}{8} + \pi\right) & \cos\left(\frac{\pi k}{8} + \pi\right) \end{bmatrix}$$

$$= -\begin{bmatrix} \cos\left(\frac{\pi k}{8}\right) & -\sin\left(\frac{\pi k}{8}\right) \\ \sin\left(\frac{\pi k}{8}\right) & \cos\left(\frac{\pi k}{8}\right) \end{bmatrix}$$

$$= -\Phi_k$$

results in the following expression for the correlation matrix:

$$\Lambda_{k+8} = \Phi_{k+8}\Lambda\Phi_{k+8}^T = [-\Phi_k]\Lambda[-\Phi_k]^T = \Phi_k\Lambda\Phi_k^T = \Lambda_k \quad (21)$$

The relation above implies that $\Lambda_k$ is cyclic with only eight relevant matrices which may be calculated a priori before the equalizer rather than needing to be calculated at each equalizer step.

It is important to note that the model presented above is for an equalizer which is placed after a whitening matched filter (WMF) process. This implies that that correlation estimates are performed twice during each burst, i.e. once for the left side of the burst and once for the right side of the burst.

Per-Survivor Equalization Error Prediction (PSP)

When the correlated noise model of the present invention is considered, other modules within or external to the equalizer may need to be extended to incorporate the new metric. One such process is the PSP whitening process, which is described in more detail below.

Similarly to the above described metric with I/Q correlation, we may also consider temporal error correlation. This effect may be modeled as a correlation between consecutive samples of the error signal. The temporal correlation extends the interference signal model, while being relatively simple in terms of receiver resources and which also preserves the blind receiver attribute. Applying this notion to an equalization process is conventionally termed PSP (per survivor processing) but can also be considered an 'equalization error reduction algorithm'.

Consider a simple model for the equalization path error process as follows:

$$n_k = c \cdot n_{k-1} + w_k \quad (22)$$

where $n_k$ denotes the error process;

c represents a complex scalar;

$w_k$ is WSS white complex Gaussian process;

The error process defined above is commonly termed a first order auto-regressive process. It is clear that under the model presented, having c and $n_{k-1}$ may reduce the residual error from $n_k$ to $w_k$.

In operation, $n_{k-1}$ is derived during equalization, while c is estimated. In addition, one may use two models for the error signal. The first model is used for a main signal and an interfering signal with similar angle of rotation. This case appears in GMSK/GMSK and 8PSK/8PSK scenarios. The second model is used where the main signal and the interfering signals have an offset in their angle of rotation. These cases are denoted GMSK/8PSK and 8PSK/GMSK accordingly. Preferably, the two different cases are treated separately.

Assuming that the existence of an offset in the rotation angle is known to the modem in both cases, it is then required to have an un-rotated error process. Taking the error samples measured over the TSC, one may estimate c using the following equation:

$$\hat{c} = \frac{\hat{R}_{n,n}[1]}{\hat{R}_{n,n}[0]} \quad (23)$$

The equation for ĉ corresponds both to a Yule-Walker equation formulation and to an LS approach. The difference between the two approaches is that $$R_{n,n}^{YW}[0] = \frac{1}{N} \sum_{i=1}^{N} |n_i|^2 \quad (24)$$

and $$R_{n,n}^{LS}[0] = \frac{1}{N-1} \sum_{i=1}^{N-1} |n_i|^2. \quad (25)$$

For both cases $$R_{n,n}[1] = \frac{1}{N-1} \sum_{i=1}^{N-1} n_i \cdot n_{i+1}^*. \quad (26)$$

For both cases presented above the change in the error process model requires a correction to the error correlation matrix. This is because of the need to properly calculate the new error process according to the following equation $$\hat{w}_k = n_k - \hat{c} \cdot n_{k-1}. \quad (27)$$

First, we write w and n for noting the vector form:

$$x = \begin{pmatrix} x^R \\ x^I \end{pmatrix} \text{ and } w = \begin{pmatrix} w^R \\ w^I \end{pmatrix},$$

getting:

$$w_k = \begin{pmatrix} w_k^R \\ w_k^I \end{pmatrix} \quad (28)$$

$$= \begin{pmatrix} n_k^R \\ n_k^I \end{pmatrix} - \begin{pmatrix} [\hat{c} \cdot n_{k-1}]^R \\ [\hat{c} \cdot n_{k-1}]^I \end{pmatrix}$$

$$= \begin{pmatrix} n_k^R \\ n_k^I \end{pmatrix} - \begin{pmatrix} \hat{c}^R \cdot n_{k-1}^R - \hat{c}^I \cdot n_{k-1}^I \\ \hat{c}^R \cdot n_{k-1}^I + \hat{c}^I \cdot n_{k-1}^R \end{pmatrix}$$

$$= \begin{pmatrix} n_k^R \\ n_k^I \end{pmatrix} - \overbrace{\begin{pmatrix} \hat{c}^R & -\hat{c}^I \\ \hat{c}^I & \hat{c}^R \end{pmatrix}}^{\hat{c}} \begin{pmatrix} n_{k-1}^R \\ n_{k-1}^I \end{pmatrix}$$

$$= n_k - \hat{C} \cdot n_{k-1}$$

The new error process ($\hat{w}_k$) correlation matrix is derived as follows:

$$\Lambda_k = E(w_k \cdot w_k^T) \quad (29)$$

$$= E\left((n_k - \hat{C} \cdot n_{k-1}) \cdot (n_k - \hat{C} \cdot n_{k-1})^T\right)$$

$$= \Lambda - 2 \cdot \hat{C} \cdot E(n_{k-1} \cdot n_k^T) + \hat{C} \cdot \Lambda \cdot \hat{C}^T$$

$$= \Lambda - \hat{C} \cdot \Lambda \cdot \hat{C}^T$$

where the last equation is from:

$$E(n_{k-1} \cdot n_k^T) = E(n_{k-1} \cdot (\hat{C} \cdot n_{k-1} + w_k)^T) = E(n_{k-1} \cdot n_{k-1}^T \cdot \hat{C}^T + n_{k-1} w_k^T) = \Lambda \cdot \hat{C}^T + 0 = \Lambda \cdot \hat{C}^T \quad (30)$$

It can be observed that the process of noise prediction reduces the variance (and I/Q covariance) of the equalization error.

Extending the Model: Optimal Linear Predictor

By referring to the signals (noise and main signals) as vectors rather than complex numbers, the model of equalization error prediction can be extended in the following manner. The vector $n_k$ is predicted using $\hat{n}_k = C \cdot n_{k-1}$, where the predicting matrix C, is not necessarily a matrix representing a complex number (i.e. a matrix C where $C_{11} = C_{22}$; $C_{12} = -C_{21}$). The optimal predicting matrix using a minimum mean square error (MMSE) technique is used to achieve the minimum mean square error (i.e. variance and I/Q covariance) as follows.

The well-known MMSE optimal linear estimator for a vector $\underline{x}$ out of the vector $\underline{y}$ is give by $$\hat{\underline{x}} = C_{XY} \cdot C_{YY}^{-1} \cdot \underline{y} \tag{31}$$

and the mean square error is given by $$MSE = C_{XX} - C_{XY} \cdot C_{YY}^{-1} \cdot C_{YX} \tag{32}$$

Translating the estimator and the mean squared error (MSE) equations yields the following.

Estimating $n_k$ out of $n_{k-1}$:

$$A \hat{=} C_{n_k n_k} = E[n_k n_k^T] = E[n_{k-1} n_{k-1}^T]$$

$$B \hat{=} C_{n_k n_{k-1}} = E[n_k n_{k-1}^T] \tag{33}$$

The optimal prediction matrix is $$C \hat{=} C_{n_k n_{k-1}} C_{n_k n_k}^{-1} = BA^{-1} \tag{34}$$

while the MSE is defined as $\Lambda = A - BA^{-1}B^T$. Note that the MSE is exactly the correlation matrix of the residual noise $w_k$ that fits into the model as follows:

$$MSE = E[(\hat{n}_k - n_k)(\hat{n}_k - n_k)^T] = E[(C \cdot n_{k-1} - n_k)(C \cdot n_{k-1} - n_k)^T] = E[w_k w_k^T] = \Lambda \tag{35}$$

In order to estimate the prediction matrices A, B and C, we estimate the correlation values in the same manner as above:

$$A_{11} = E\left((n_k^R)^2\right) \approx \frac{1}{N-1} \text{Re}(\tilde{e})^T \cdot \text{Re}(\tilde{e}); \tag{36}$$

$$A_{22} = E\left((n_k^I)^2\right) \approx \frac{1}{N-1} \text{Im}(\tilde{e})^T \cdot \text{Im}(\tilde{e})$$

$$A_{12} = A_{21} = E(n_k^R n_k^I) \approx \frac{1}{N-1} \text{Re}(\tilde{e})^T \cdot \text{Im}(\tilde{e})$$

$$B_{11} = E(n_k^R n_{k-1}^R) \approx \frac{1}{N-1} \text{Re}(\tilde{e})^T \cdot \text{Re}(\hat{\tilde{e}}); \tag{37}$$

$$B_{22} = E(n_k^I n_{k-1}^I) \approx \frac{1}{N-1} \text{Im}(\tilde{e})^T \cdot \text{Im}(\hat{\tilde{e}})$$

$$B_{12} = E(n_k^R n_{k-1}^I) \approx \frac{1}{N-1} \text{Re}(\tilde{e})^T \cdot \text{Im}(\hat{\tilde{e}});$$

$$B_{21} = E(n_k^I n_{k-1}^R) \approx \frac{1}{N-1} \text{Im}(\tilde{e})^T \cdot \text{Re}(\hat{\tilde{e}})$$

where $\hat{\tilde{e}}0$ is the vector $\tilde{e}$ with a shift of one symbol 'backwards': $\hat{e}_k = \tilde{e}_{k-1}$; $1 \leq k \leq N-1$.

The implications on the metric calculation will now be discussed. Given samples of equalization errors $\tilde{n}_k$ and $\tilde{n}_{k-1}$, we need to calculate the metric for a given decision. Note that $\tilde{n}_k$ is a sample of the equalization noise, without de-rotation, while $n_k$ is de-rotated. Recalling that $$\Phi_k \hat{=} \begin{bmatrix} \cos\left(\frac{\pi k}{8}\right) & -\sin\left(\frac{\pi k}{8}\right) \\ \sin\left(\frac{\pi k}{8}\right) & \cos\left(\frac{\pi k}{8}\right) \end{bmatrix} \tag{38}$$

we note that $\tilde{n}_k \hat{=} \Phi_{-k} n_k$ which yields the following:

$$w_k = n_k - C \cdot n_{k-1} = \Phi_k \tilde{n}_k - C \cdot \Phi_{k-1} \tilde{n}_{k-1}. \tag{39}$$

The following is used to calculate the metric of an equalization error at time k:

$$\text{Metric} = w_k^T \cdot \Lambda^{-1} \cdot w_k \tag{40}$$

$$= (\Phi_k \tilde{n}_k - C\Phi_{k-1}\tilde{n}_{k-1})^T \Lambda^{-1} (\Phi_k \tilde{n}_k - C\Phi_{k-1}\tilde{n}_{k-1})$$

$$= (\Phi_k \tilde{n}_k - \Phi_k \Phi_{-k} C\Phi_{k-1}\tilde{n}_{k-1})^T \Lambda^{-1} (\Phi_k \tilde{n}_k - \Phi_k \Phi_{-k} C\Phi_{k-1}\tilde{n}_{k-1})$$

$$= (\tilde{n}_k - \Phi_{-k} C\Phi_{k-1}\tilde{n}_{k-1})^T \Phi_k^T \Lambda^{-1} \Phi_k (\tilde{n}_k - \Phi_{-k} C\Phi_{k-1}\tilde{n}_{k-1})$$

$$= (\tilde{n}_k - \Phi_{-k} C\Phi_{-1} \Phi_k \tilde{n}_{k-1})^T \Phi_k^T \Lambda^{-1} \Phi_k (\tilde{n}_k - \Phi_{-k} C\Phi_{-1} \Phi_k \tilde{n}_{k-1})$$

The final expression for the metric thus includes consideration for rotation, I/Q correlation and temporal error correlation. The metric now depends on the expressions: $\tilde{n}_k$, $\tilde{n}_{k-1}$, which are provided in the equalization process along with $\Phi_{-k} C \Phi_{-1} \Phi_k$, $\Phi_k^T \Lambda^{-1} \Phi_k$. Note that these last two expressions are pre-calculated and stored in a lookup table as described in connection with Equation 21 supra.

Soft Value Generation

Note that modifying the metric model to one that takes into consideration additive noise with correlated in phase and quadrature (I/Q) elements changes the conditional probability Pr($\underline{y}|\underline{x}$). The first change, as described above, is made in the way the equalizer selects the surviving path, i.e. the metric according to the present invention. If soft symbols or bits are to be generated, the soft value generator (SVG) within the receiver is modified accordingly. The soft values are in fact log of likelihood rates which rely heavily on Pr($\underline{y}|\underline{x}$). Changes to the SVG are described in more detail hereinbelow.

As described supra, the hard decisions output by the equalizer represent the most likely series of symbols. One way to improve the performance of the receiver is to associate soft values to the hard decisions. The soft value of an equalizer output bit is the log of the likelihood ratio (LLR) for that bit which provides a measure of how 'strong' the corresponding hard decision is. The backend outer decoder uses the soft value information to improve decoding of the information bits.

The soft values rely on the hard decisions generated by the equalizer. Thus, the soft value generator is a post decision module. The soft value corresponding to a specific bit may be found by deriving the LLR of error probabilities for that specific bit:

$$LLR(b_j = 1) = \ln \frac{P(\underline{y}|b_j = 1)}{P(\underline{y}|b_j = 0)} \tag{41}$$

The above presented log-likelihood-ratio can be represented in terms of the symbol LLR as:

$$LLR(b_j = 1) = \ln\left[\sum_{l \in D_{j1}} e^{LLR(S_k = A_l)}\right] - \ln\left[\sum_{l \in D_{j0}} e^{LLR(S_k = A_l)}\right]; \tag{42}$$

$$LLR(S_k = A_l) = \ln \frac{P(\underline{y}|S_k = A_l)}{P(\underline{y}|S_k = A_0)}$$

where
  $S_k$ is the $k^{th}$ symbol decision;
  $A_l$ is the symbol value;

$A_0$ is the reference symbol value;

$b_j$ is the bit value for the $j^{th}$ bit of the symbol;

$D_{j0}$, $D_{j1}$ represents the set of symbols in which $b_j=0$ and 1, respectively;

In order to reduce complexity while maintaining performance, the following approximation is used:

$$\ln\left[\sum_{l\in D_{jb}} e^{LLR(S_k=A_l)}\right] \approx \max_{l\in D_{jb}}[LLR(S_k=A_l)] \quad b=0,1 \qquad (43)$$

The symbol that makes this approximation valid may be found from a table generated a priori.

We assume that during the LLR calculation of the $k^{th}$ symbol, all the other symbols in $\underline{S}$ (i.e. the hard decision vector) are free of decision errors. Therefore we may use the following expression:

$$\ln\frac{P(\underline{y}|S_k=A_l)}{P(\underline{y}|S_k=A_0)} = \ln\frac{P(\underline{y}|\hat{\underline{S}})}{P(\underline{y}|\underline{S})} \qquad (44)$$

where $\hat{\underline{S}}$ is the vector $\underline{S}$, with a change only in the $k^{th}$ symbol. Let $\underline{S}^h = \underline{h} * \underline{S}$ denote $\underline{x}^h$ for the sake of clarity.

$$Pr(\underline{y}|\underline{S}^h) = \prod_i Pr(y_i|S_i^h) \qquad (45)$$

$$= \prod_i \frac{1}{2\pi\sigma^2} \exp\left[-\frac{|y_i - S_i^h|^2}{2\sigma^2}\right].$$

$$\ln\frac{P(\underline{y}|\hat{\underline{S}})}{P(\underline{y}|\underline{S})} = \ln\frac{Pr(\underline{y}|\underline{h}*\hat{\underline{S}})}{Pr(\underline{y}|\underline{h}*\underline{S})} \qquad (46)$$

$$= \ln\frac{Pr(\underline{y}|\hat{\underline{S}}^h)}{Pr(\underline{y}|\underline{S}^h)}$$

$$= \ln\frac{\prod_i Pr(y_i|\hat{S}_i^h)}{\prod_i Pr(y_i|S_i^h)}$$

$$= \ln\frac{\prod_i \frac{1}{2\pi\sigma^2}\exp\left[-\frac{|y_i-\hat{S}_i^h|^2}{2\sigma^2}\right]}{\prod_i \frac{1}{2\pi\sigma^2}\exp\left[-\frac{|y_i-S_i^h|^2}{2\sigma^2}\right]}$$

$$= \ln\left[\prod_i \exp\left[-\frac{|y_i-\hat{S}_i^h|^2}{2\sigma^2}\right]\right] -$$

$$\ln\left[\prod_i \exp\left[-\frac{|y_i-S_i^h|^2}{2\sigma^2}\right]\right]$$

$$= \frac{1}{2\sigma^2}\sum_i |y_i-S_i^h|^2 - \frac{1}{2\sigma^2}\sum_i |y_i-\hat{S}_i^h|^2$$

One may observe that $\hat{S}$ and $S$ differ only in their $k^{th}$ symbol, $\hat{S}^h$ and $S^h$ differ only in symbols $j$; $k \leq j \leq k+L-1$. According to this observation the summation is effected only over the channel length $-L$ as follows:

$$\ln\frac{P(\underline{y}|\hat{\underline{S}})}{P(\underline{y}|\underline{S})} = \frac{1}{2\sigma^2}\sum_{i=k}^{k+L-1}|y_i-S_i^h|^2 - \frac{1}{2\sigma^2}\sum_{i=k}^{k+L-1}|y_i-\hat{S}_i^h|^2 \qquad (47)$$

Using the notation: $y_i - S_i^h = e_i$, $y_i - \hat{S}_i^h = \hat{e}_i$, where $e_i$ and $\hat{e}_i$ are complex numbers, the following relation holds:

$$\ln\frac{P(\underline{y}|S_k=A_l)}{P(\underline{y}|S_k=A_0)} = \frac{1}{2\sigma^2}\left(\sum_i |e_i|^2 - |\hat{e}_i|^2\right) \qquad (48)$$

Therefore: (49)

$$\Rightarrow LLR(b_j=1) \approx \max_{l\in D_{j1}}(LLR(S_k=A_l)) - \max_{l\in D_{j0}}(LLR(S_k=A_l)) =$$

$$\max_{l\in D_{j1}}\left(\frac{1}{2\sigma^2}\left(\sum_i |e_i|^2 - |\bar{e}_{i,l}|^2\right)\right) - \max_{l\in D_{j0}}\left(\frac{1}{2\sigma^2}\left(\sum_i |e_i|^2 - |\bar{e}_{i,l}|^2\right)\right) =$$

$$\max_{l\in D_{j1}}\left(\frac{1}{2\sigma^2}\left(\sum_i -|\bar{e}_{i,l}|^2\right)\right) - \max_{l\in D_{j0}}\left(\frac{1}{2\sigma^2}\left(\sum_i -|\bar{e}_{i,l}|^2\right)\right) =$$

$$\min_{l\in D_{j1}}\left(\frac{1}{2\sigma^2}\left(\sum_i |\bar{e}_{i,l}|^2\right)\right) - \min_{l\in D_{j0}}\left(\frac{1}{2\sigma^2}\left(\sum_i |\bar{e}_{i,l}|^2\right)\right)$$

The expression $$\min_{l\in D_{j0}}\left(\frac{1}{2\sigma^2}\left(\sum_i |\bar{e}_{i,l}|^2\right)\right)$$

is obtained directly from the equalizer hard-decisions. Since the equalizer performs a minimization of the error (Euclidian) metric no minimum operation is needed for this part of the expression above.

$$\Rightarrow LLR(b_j=1) \approx \min_{l\in D_{j1}}\left(\frac{1}{2\sigma^2}\left(\sum_i |\bar{e}_{i,l}|^2\right)\right) - \frac{1}{2\sigma^2}\sum_i |e_i^{eq}|^2 = \qquad (50)$$

$$\min_{l\in D_{j1}}\left(\frac{1}{2\sigma^2}\left(\sum_i |\bar{e}_{i,l}|^2 - |e_i^{eq}|^2\right)\right)$$

$$\hat{e}_i = y_i - \hat{S}_i^h = y_i - \hat{S}_i * h = y_i - \sum_{n=0}^{L-1} h_n \cdot \hat{S}_{i-n}. \qquad (51)$$

Assuming an error only in the $k^{th}$ symbol, and $0 \leq i-k < L$, $i-k = \Delta$, $$\hat{e}_i = y_i - \sum_{n=0, n\neq \Delta}^{L-1} h_n \cdot \hat{S}_{i-n} - h_\Delta \cdot \hat{S}_{i-\Delta} \qquad (52)$$

$$= y_i - \sum_{n=0, n\neq \Delta}^{L-1} h_n \cdot \hat{S}_{i-n} - h_\Delta \cdot \hat{S}_{i-\Delta} + h_\Delta \cdot S_{i-\Delta} - h_\Delta \cdot S_{i-\Delta}$$

Since $\hat{S}$ and $S$ differ only by their $k^{th}$ symbols:

$$y_i - \sum_{n=0, n \neq \Delta}^{L-1} h_n \cdot S_{i-n} - h_\Delta \cdot \hat{S}_{i-\Delta} + h_\Delta \cdot S_{i-\Delta} - h_\Delta \cdot S_{i-\Delta} = \tag{53}$$

$$y_i - \sum_{n=0}^{L-1} h_n \cdot S_{i-n} - h_\Delta \cdot \hat{S}_{i-\Delta} + h_\Delta \cdot S_{i-\Delta}$$

$$e_i^{eq} - h_\Delta \cdot (\hat{S}_{i-\Delta} - S_{i-\Delta}) = e_i^{eq} - h_\Delta \cdot \Delta S = \hat{e}_i \tag{54}$$

$$\Rightarrow LLR(b_j = 1) \approx \frac{1}{2\sigma^2} \cdot \min_{l \in D_{j1}} \left( \sum_{i=0}^{L-1} |e_i^{eq} - h_i \cdot \Delta S_l|^2 - |e_i^{eq}|^2 \right) \tag{55}$$

The soft value generation process, including the generation of soft symbol values, conversion of soft symbols to soft bits and a symbol competitor algorithm, is described in more detail in the following: U.S. Pat. No. 6,731,700, entitled "Soft Decision Output Generator," U.S. Pat. No. 6,944,242, entitled "Apparatus For And Method Of Converting Soft Symbol Information To Soft Bit Information," and U.S. Pat. No. 6,529,559, entitled "Reduced Soft Output Information Packet Selection," all of which are hereby incorporated herein by reference in their entirety.

Figure 10:
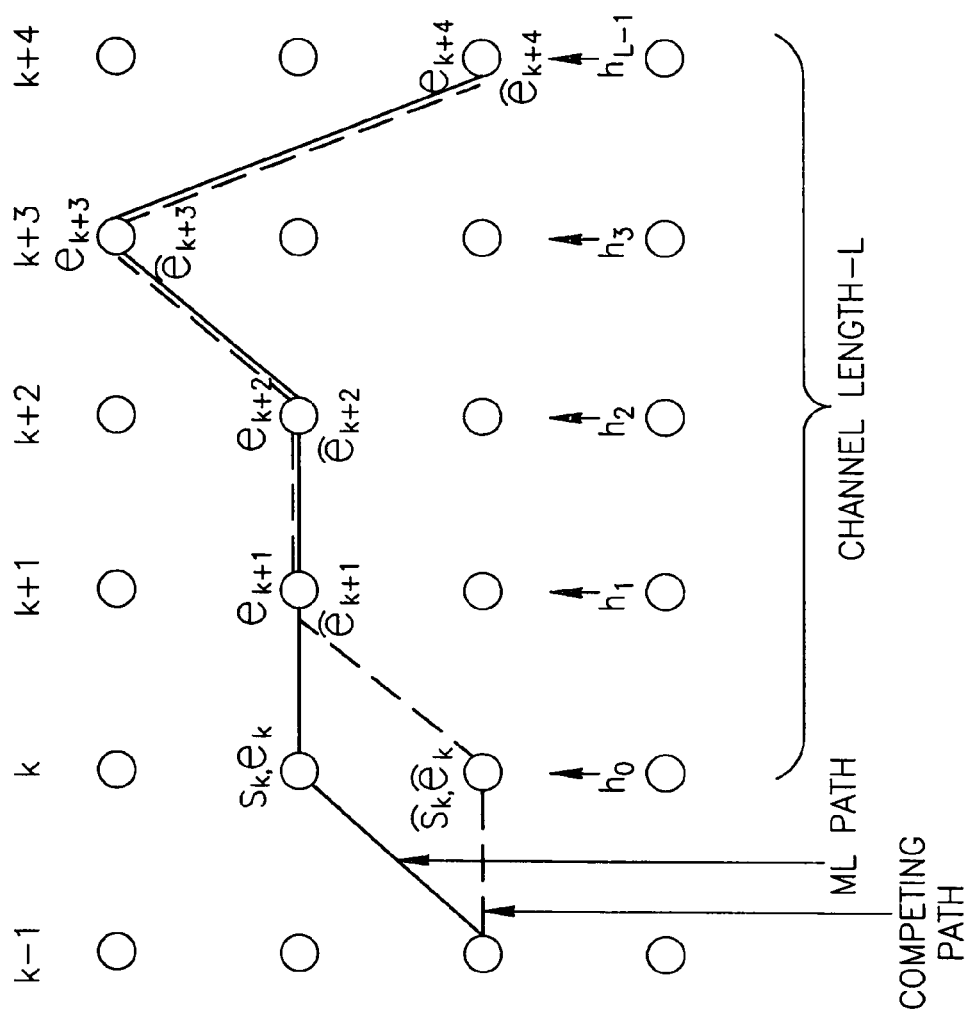
FIG. 10 is a trellis diagram illustrating the effect of a competitor symbol on the cumulative metric calculation.

As an example of the benefit of the soft value generator, a trellis diagram illustrating the effect of a competitor symbol on the cumulative metric calculation is shown in FIG. 10 for a channel length of L–1. The maximum likelihood path is shown as the solid trace while the competing path is shown as the dashed trace.

Model Extension 1: De-Correlation

As described supra in the section entitled "I/Q Correlated Noise", the input samples are marked as vectors of two real elements:

$$x = \begin{pmatrix} x^R \\ x^I \end{pmatrix}. \tag{Equation 6}$$

Since the noise probability distribution function is defined by:

$$f_N(n) = \frac{1}{2\pi \sqrt{\|\Lambda\|}} \exp\left[ -\frac{1}{2} n^T \Lambda^{-1} n \right] \tag{56}$$

where $$\Lambda = E(n \cdot n^T) = E\left( \begin{bmatrix} (n^R)^2 & n^R n^I \\ n^I n^R & (n^I)^2 \end{bmatrix} \right) \tag{57}$$

$$\ln \frac{P(\underline{y}|\hat{\underline{S}})}{P(\underline{y}|\underline{S})} = \ln \left[ \prod_i \exp\left[ -\frac{1}{2} \cdot [\underline{y}_i - \hat{\underline{S}}_i^h]^T \Lambda^{-1} [\underline{y}_i - \hat{\underline{S}}_i^h] \right] \right] - \tag{58}$$

$$\ln \left[ \prod_i \exp\left[ -\frac{1}{2} \cdot [\underline{y}_i - \underline{S}_i^h]^T \Lambda^{-1} [\underline{y}_i - \underline{S}_i^h] \right] \right] =$$

$$\frac{1}{2} \sum_{i=k}^{k+L-1} [\underline{y}_i - \hat{\underline{S}}_i^h]^T \Lambda^{-1} [\underline{y}_i - \hat{\underline{S}}_i^h] - \frac{1}{2} \sum_{i=k}^{k+L-1} [\underline{y}_i - \underline{S}_i^h]^T \Lambda^{-1} [\underline{y}_i - \underline{S}_i^h]$$

where

-continued $$\underline{S}_i^h = \sum_{n=0}^{L-1} H_i \cdot \underline{S}_{i-n} \tag{59}$$

and $H_i$ is the $i^{th}$ tap of the channel vector $\underline{h}$ in a matrix form:

$$H_i = \begin{bmatrix} h_i^R & -h_i^I \\ h_i^I & h_i^R \end{bmatrix}; \tag{60}$$

where $h_i^R = \text{Re}\{h_i\}$, $h_i^I = \text{Im}\{h_i\}$.

Similarly to previous derivations above we denote $\hat{\underline{e}}_i = \underline{y}_i - \hat{\underline{S}}_i^h$, $\underline{e}_i = \underline{y}_i - \underline{S}_i^h$.

$$\Rightarrow LLR(b_j = 1) \approx \tag{61}$$

$$\min_{l \in D_{j1}} \left( \frac{1}{2} \left( \sum_i (\hat{\underline{e}}_{i,l})^T \Lambda^{-1} (\hat{\underline{e}}_{i,l}) \right) \right) - \frac{1}{2} \sum_i (\underline{e}_i^{eq})^T \Lambda^{-1} (\underline{e}_i^{eq}) =$$

$$\min_{l \in D_{j1}} \left( \frac{1}{2} \left( \sum_i (\hat{\underline{e}}_{i,l})^T \Lambda^{-1} (\hat{\underline{e}}_{i,l}) - (\underline{e}_i^{eq})^T \Lambda^{-1} (\underline{e}_i^{eq}) \right) \right)$$

$$\underline{e}_i^{eq} - H_\Delta \cdot (\hat{\underline{S}}_{i-\Delta} - \underline{S}_{i-\Delta}) = \underline{e}_i^{eq} - H_\Delta \cdot \underline{\Delta S} = \hat{\underline{e}} \tag{62}$$

$$\Rightarrow LLR(b_j = 1) \approx \frac{1}{2} \cdot \tag{63}$$

$$\min_{l \in D_{j1}} \left( \sum_{i=0}^{L-1} (\underline{e}_i^{eq} - H_i \cdot \underline{\Delta S}_l)^T \Lambda^{-1} (\underline{e}_i^{eq} - H_i \cdot \underline{\Delta S}_l) - (\underline{e}_i^{eq})^T \Lambda^{-1} (\underline{e}_i^{eq}) \right)$$

Note that the above relation does not consider the rotation detailed in the section above entitled "Rotation and Relation to Interference Cancellation". Considering the rotation, $\Lambda^{-1}$ is selected out of the array of eight $\Lambda^{-1}$ matrices (Equation 20), rather than using a constant $\Lambda^{-1}$.

Taking into account rotation modifies the expression presented above to the following relationship where $\Lambda_k^{-1}$ changes across time:

$$\Rightarrow LLR(b_j = 1) \approx \frac{1}{2} \cdot \tag{64}$$

$$\min_{l \in D_{j1}} \left( \sum_{i=0}^{L-1} (\underline{e}_i^{eq} - H_i \cdot \underline{\Delta S}_l)^T \Lambda_{k+i}^{-1} (\underline{e}_i^{eq} - H_i \cdot \underline{\Delta S}_l) - (\underline{e}_i^{eq})^T \Lambda_{k+i}^{-1} (\underline{e}_i^{eq}) \right)$$

Note that the expression presented above presents the Max-Log solution rather than a solution of the type described in U.S. Pat. No. 6,529,559 cited supra. Since the correlation matrix stretches the symbol plane at each burst into an unknown direction, the max-log is needed. Using an I/Q whitened version of the path errors, however, may solve this problem.

Model Extension 2: PSP

As detailed supra, the noise may be formulated as a first order autoregressive (AR) process. The process correlation coefficient $\alpha$ can be estimated from the training sequence:

$$n_k = \hat{\alpha} \cdot n_{k-1} + w_k \Rightarrow \hat{w}_k = n_k - \hat{\alpha} \cdot n_{k-1} \tag{65}$$

where $\hat{w}_k$ is a "temporally white" noise. Note that here the noise is complex and is not represented by vector notation as in the previous section. In addition, we relax the rotation assumption for simplicity. In similarity to the derivation steps outlined above:

$$\hat{e}_i = e_i^{eq} - h_\Delta \cdot (\hat{S}_{i-\Delta} - S_{i-\Delta}) = e_i^{eq} - h_\Delta \cdot \Delta S \qquad (66)$$

The above expression can also be extended for the case where $e_i$ has a temporal correlation as follows:

$$\eta_i = e_i - \hat{\alpha} \cdot e_{i-1} \qquad (67)$$

In the above equation, $\eta_i$ represents a temporally white additive Gaussian noise. In this case, it is assumed that the error signal $e_i$ obeys a first order AR model with the coefficient $\alpha$. Therefore:

$$\hat{\eta}_i = y_i \sum_{n=0}^{L-1} h_n \cdot \hat{S}_{i-n} - \alpha \cdot \hat{e}_{i-1} \qquad (68)$$

$$= y_i - \sum_{n=0}^{L-1} h_n \cdot S_{i-n} - h_\Delta \cdot \hat{S}_{i-\Delta} + h_\Delta \cdot S_{i-\Delta} - \alpha \cdot \hat{e}_{i-1}$$

$$= y_i - \sum_{n=0}^{L-1} h_n \cdot S_{i-n} - h_\Delta \cdot \hat{S}_{i-\Delta} + h_\Delta \cdot S_{i-\Delta} - \alpha \cdot [e_{i-1}^{eq} - h_{\Delta-1} \cdot \Delta S]$$

$$= y_i - \sum_{n=0}^{L-1} h_n \cdot S_{i-n} - \alpha \cdot e_{i-1}^{eq} - h_\Delta \cdot \Delta S - \alpha \cdot h_{\Delta-1} \cdot \Delta S$$

$$= \eta_i^{eq} - [h_\Delta - \alpha \cdot h_{\Delta-1}] \cdot \Delta S$$

$$\Rightarrow \hat{\eta}_i = \eta_i^{eq} - \tilde{h}_\Delta \cdot \Delta S; \text{ where } \tilde{h}_\Delta = [h_\Delta - \alpha \cdot h_{\Delta-1}]$$

Since $\hat{\eta}_i$ and $\eta_i^{eq}$ obey the same relationship as $\hat{e}_i$ and $e_i^{eq}$, the remainder of the derivatation is similar with the exception of a modified channel. The modified channel is the original channel filtered by the filter $[1, -\alpha]$.

$$\Rightarrow LLR(b_j = 1) \approx \qquad (69)$$

$$\frac{1}{2\sigma^2} \cdot \min_{l \in D_{j1}} \left( \sum_{i=0}^{L} |\eta_i^{eq} - [h_i - \alpha \cdot h_{i-1}] \cdot \Delta S_l|^2 - |\eta_i^{eq}|^2 \right) =$$

$$\frac{1}{2\sigma^2} \cdot \min_{l \in D_{j1}} \left( \sum_{i=0}^{L} |\eta_i^{eq} - \tilde{h}_i \cdot \Delta S_l|^2 - |\eta_i^{eq}|^2 \right)$$

Since I/Q correlation is not taken into account here, the solution outlined in U.S. Pat. No. 6,529,559 cited supra, can be used here as well.

Model Extension 3: Vector PSP

In this section both the PSP solution and the vector representation are taken into account. As detailed hereinabove, the predicting matrix C, is not necessarily a matrix representing a complex number.

$$\underline{n}_k = \hat{C} \cdot \underline{n}_{k-1} + \underline{w}_k \Rightarrow \hat{\underline{w}}_k = \underline{n}_k - \hat{C} \cdot \underline{n}_{k-1}. \qquad (70)$$

An I/Q de-correlation matrix is used in this model as well, as detailed supra. The derivation used above can be extended to vector form in the following manner:

$$\hat{\underline{\eta}}_i = \underline{y}_i - \sum_{n=0}^{L-1} H_n \cdot \hat{\underline{S}}_{i-n} - C \cdot \hat{\underline{e}}_{i-1} \qquad (71)$$

$$= \underline{y}_i - \sum_{n=0}^{L-1} H_n \cdot \underline{S}_{i-n} - H_\Delta \cdot \hat{\underline{S}}_{i-\Delta} + H_\Delta \cdot \underline{S}_{i-\Delta} - C \cdot \hat{\underline{e}}_{i-1}$$

$$= \underline{y}_i - \sum_{n=0}^{L-1} H_n \cdot \underline{S}_{i-n} - H_\Delta \cdot \hat{\underline{S}}_{i-\Delta} + H_\Delta \cdot \underline{S}_{i-\Delta} -$$

$$C \cdot [\underline{e}_{i-1}^{eq} - H_{\Delta-1} \cdot \underline{\Delta S}]$$

$$= \underline{y}_i - \sum_{n=0}^{L-1} H_n \cdot \underline{S}_{i-n} - C \cdot \underline{e}_{i-1}^{eq} - H_\Delta \cdot \underline{\Delta S} - C \cdot H_{\Delta-1} \cdot \underline{\Delta S}$$

$$= \underline{\eta}_i^{eq} - [H_\Delta - C \cdot H_{\Delta-1}] \cdot \underline{\Delta S}$$

$$\Rightarrow \hat{\underline{\eta}}_i = \underline{\eta}_i^{eq} - \tilde{H}_\Delta \cdot \underline{\Delta S}; \text{ where } \tilde{H}_\Delta = [H_\Delta - C \cdot H_{\Delta-1}]$$

Note that the channel coefficients $H_i$ are defined as above. Since $\hat{\underline{\eta}}_i$ and $\underline{\eta}_i^{eq}$ obey the same relationship as $\hat{\underline{e}}_i$ and $\underline{e}_i^{eq}$ the remainder of the derivation is as described above, only with a modified channel: $\tilde{H}_i = H_i - C \cdot H_{i-1}$ $$\Rightarrow LLR(b_j = 1) \approx \frac{1}{2} \cdot \qquad (72)$$

$$\min_{l \in D_{j1}} \left( \sum_{i=0}^{L} (\underline{\eta}_i^{eq} - \tilde{H}_i \cdot \underline{\Delta S}_l)^T \Lambda^{-1} (\underline{\eta}_i^{eq} - \tilde{H}_i \cdot \underline{\Delta S}_l) - (\underline{\eta}_i^{eq})^T \Lambda^{-1} (\underline{\eta}_i^{eq}) \right)$$

The $\Lambda$ in the above formula is the correlation matrix of the "temporally white" noise $\underline{\eta}_i$. Note that rotation is not taken into account in the above formula.

When taking into account the rotation, two elements in the above formula must be considered: $\Lambda$,C. Since both $\Lambda$ and C are rotated in a symbol by symbol fashion, the rotation must be incorporated into the equation as follows:

$$\Rightarrow LLR(b_j = 1) \approx \qquad (73)$$

$$\frac{1}{2} \cdot \min_{l \in D_{j1}} \left( \sum_{i=0}^{L} (\underline{\eta}_i^{eq} - \tilde{H}_{k,i} \cdot \underline{\Delta S}_l)^T \Lambda_{k+i}^{-1} (\underline{\eta}_i^{eq} - \tilde{H}_{k,i} \cdot \underline{\Delta S}_l) - \right.$$

$$\left. (\underline{\eta}_i^{eq})^T \Lambda_{k+i}^{-1} (\underline{\eta}_i^{eq}) \right)$$

$$\tilde{H}_{k,i} = H_i - C_{k+i} \cdot H_{i-1}$$

The above equation indicates that both $\Lambda$ and C are rotated according to: (1) k which denotes the error symbol index, and (2) i which denotes the channel taps. When creating the equivalent channel $\tilde{H}$, the rotation of C should be included as in the following example. Assume that the SVG input comprises the right side of the burst. As described supra, only eight C matrices are utilized. Table 1 below describes the new equivalent channel taps for different values of k. In this example L=3 and the original channel taps are given by $\{H_{-1}=0, H_0, H_1, H_2, H_3=0\}$.

TABLE 1

Calculation of channel taps for the right side of the burst in rotated vector PSP

| $((k))_8 \to$ Initial C | $\hat{H}_0$ | $\hat{H}_1$ | $\hat{H}_2$ | $\hat{H}_3$ |
|---|---|---|---|---|
| $0 \to C_0$ | $H_0 - C_0 \cdot H_{-1} = H_0$ | $H_1 - C_1 \cdot H_0$ | $H_2 - C_2 \cdot H_1$ | $H_3 - C_3 \cdot H_2 = -C_3 \cdot H_2$ |
| $1 \to C_1$ | $H_0 - C_1 \cdot H_{-1} = H_0$ | $H_1 - C_2 \cdot H_0$ | $H_2 - C_3 \cdot H_1$ | $H_3 - C_4 \cdot H_2 = -C_4 \cdot H_2$ |
| . | . | . | . | . |
| . | . | . | . | . |
| $4 \to C_4$ | $H_0 - C_4 \cdot H_{-1} = H_0$ | $H_1 - C_5 \cdot H_0$ | $H_2 - C_6 \cdot H_1$ | $H_3 - C_7 \cdot H_2 = -C_7 \cdot H_2$ |
| . | . | . | . | . |
| . | . | . | . | . |
| $7 \to C_7$ | $H_0 - C_7 \cdot H_{-1} = H_0$ | $H_1 - C_0 \cdot H_0$ | $H_2 - C_1 \cdot H_1$ | $H_3 - C_2 \cdot H_2 = -C_2 \cdot H_2$ |

Note that in Table 1 above, the notation $((a))_b$ denotes mod(a, b).

In the event the SVG input comprises the left side of the burst, the following Table 2 below presents the new equivalent channel:

TABLE 2

Calculation of channel taps for the left side of the burst in rotated vector PSP

| $((k))_8 \to$ Initial C | $\hat{H}_0$ | $\hat{H}_1$ | $\hat{H}_2$ | $\hat{H}_3$ |
|---|---|---|---|---|
| $0 \to C_0$ | $H_0 - C_0 \cdot H_{-1} = H_0$ | $H_1 - C_7 \cdot H_0$ | $H_2 - C_6 \cdot H_1$ | $H_3 - C_5 \cdot H_2 = -C_5 \cdot H_2$ |
| $1 \to C_1$ | $H_0 - C_1 \cdot H_{-1} = H_0$ | $H_1 - C_0 \cdot H_0$ | $H_2 - C_7 \cdot H_1$ | $H_3 - C_6 \cdot H_2 = -C_6 \cdot H_2$ |
| . | . | . | . | . |
| . | . | . | . | . |

Simulation Results

Figure 11:
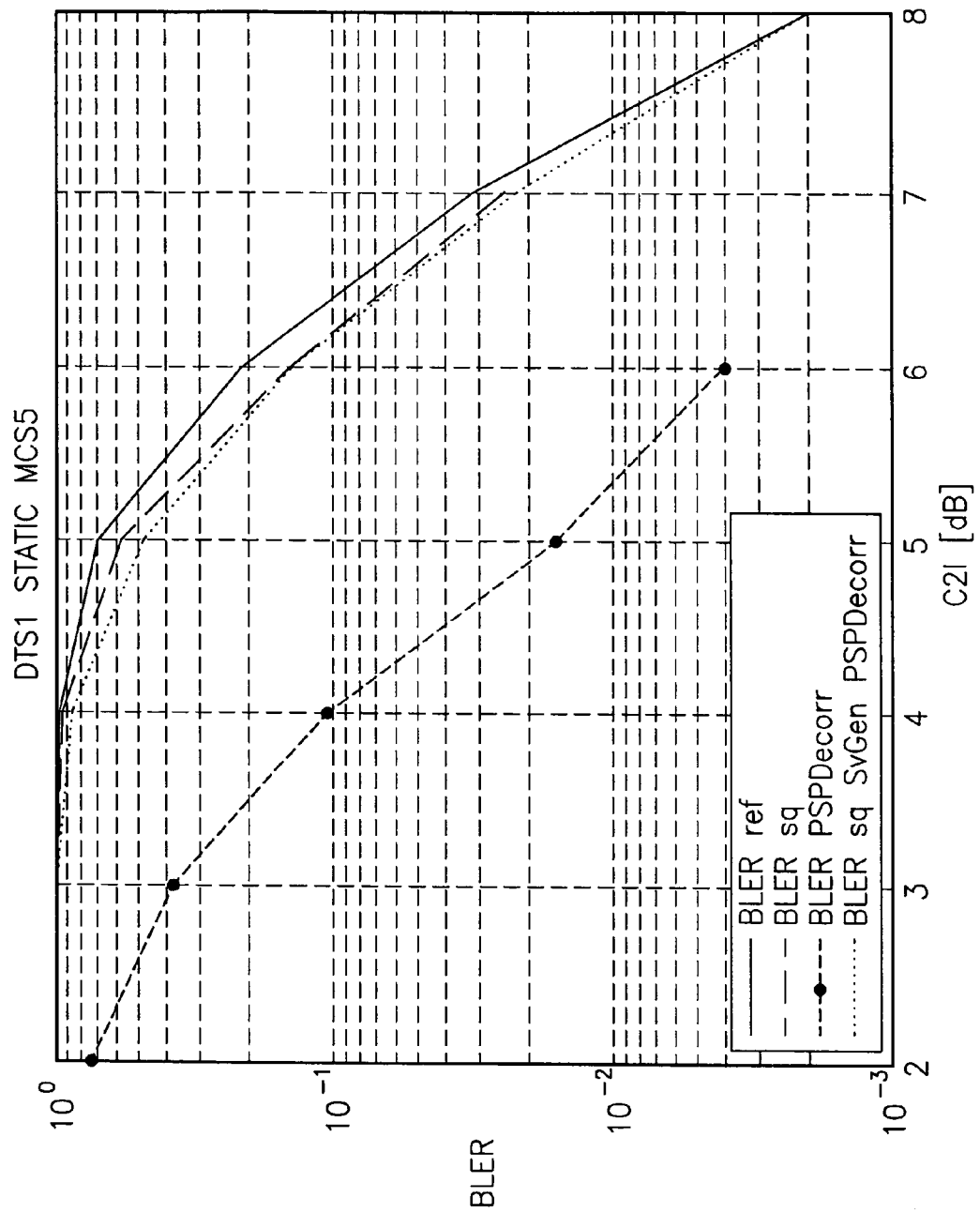
FIG. 11 is a graph illustrating simulation results for a receiver implementing the SAIC scheme of the present invention.

Simulation results are now presented for the PSK/SAIC algorithms of the present invention described above. A graph illustrating the BLER curve for a receiver implementing the SAIC scheme of the present invention is shown in FIG. 11. The EGPRS system is a Time Division Multiple Access (TDMA) system wherein eight users are able to share the same carrier frequency. In an EGPRS transmitter, the data bits are encoded with a rate ⅓ convolutional encoder, interleaved and mapped to 8-ary symbols. The resultant coded data symbols together with the training sequence are assembled into a burst of 142 symbols as shown in FIG. 2.

The burst is then modulated using 3π/8-offset 8PSK with Gaussian pulse shaping in accordance with the GSM standard. The modulated output is transmitted over an additive white Gaussian noise channel as described above. An MLSE type equalizer with a Least Squares type channel estimator was used in the receiver.

The simulations were performed using a software-based modem assuming the static MCS5 coding scheme. The results of the simulation were compared using block error rate (BLER) as the criteria. The solid line 1100 represents the results of a reference receiver with C implemented. The dashed line 1102 represents the SAIC simulation environment reference receiver with squared metric equalizer followed by a suitable SVG module. It is important to note that unlike the reference receiver this SAIC simulation environment receiver does not incorporate PSP correction.

The dotted curve 1106 represents the PSP de-correlation algorithm results wherein both the equalizer and the SVG module includes whitening of both the I/Q correlation and the temporal correlation in its model. The dash-dotted curve 1104 represents a hybrid solution where a regular squared metric equalizer is applied followed by a SVG module based on the PSP de-correlation receiver. In this case the model characterizing matrices (i.e. C, Λ) are estimated post equalization.

Several conclusions may be drawn from the results presented. First, the PSP de-correlation algorithm outperforms the other algorithms where a single interference signal (i.e. DTS1) is applied. For a static channel DTS1 the PSP de-correlation gain approaches 2.5 dB relative to the reference receiver.

GSM EDGE Embodiment

Figure 12:
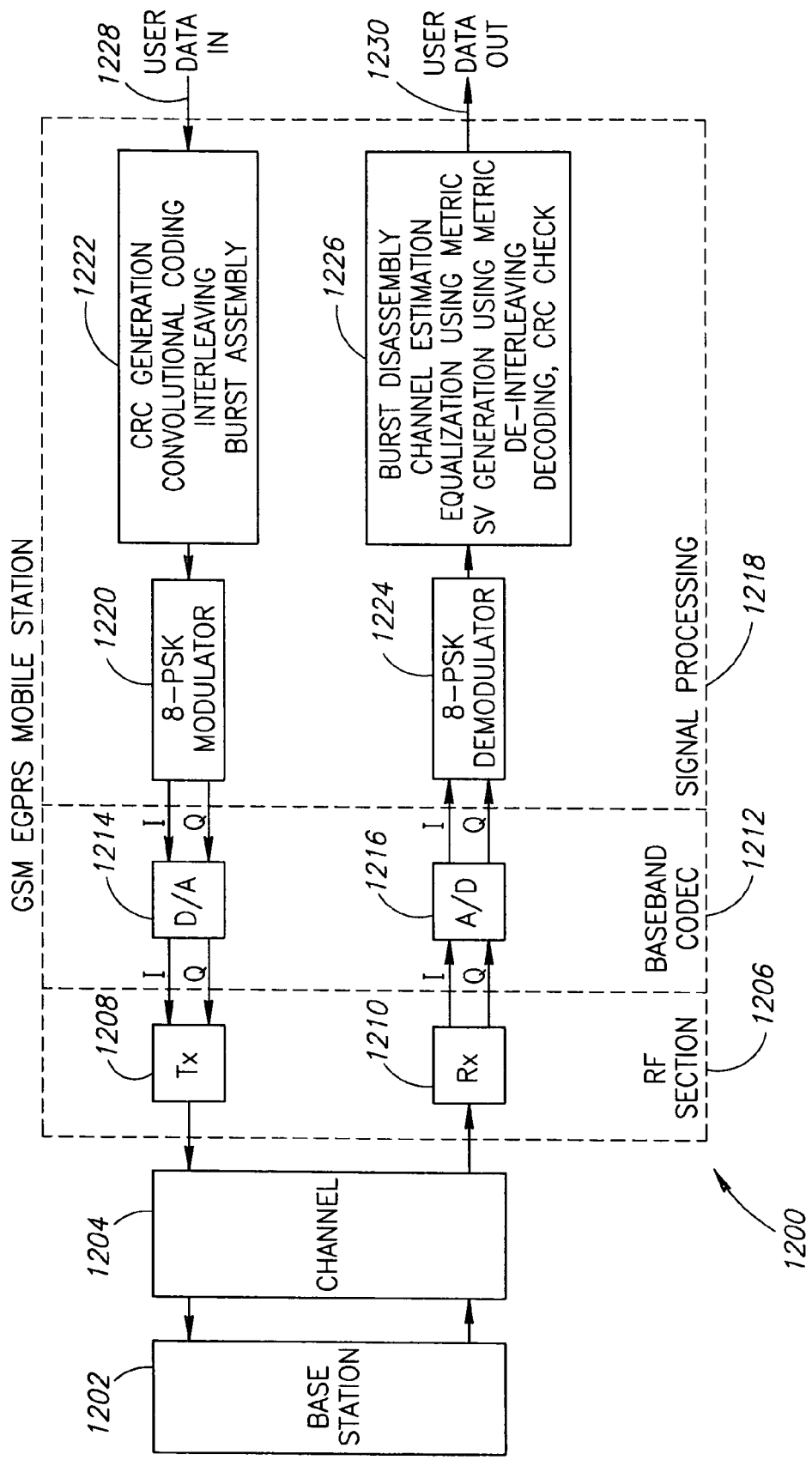
FIG. 12 is a block diagram illustrating the processing blocks of a GSM EGPRS mobile station in more detail including RF, baseband and signal processing blocks.

A GSM EGPRS mobile station constructed to comprise means for performing the channel tracking method of the present invention is presented. A block diagram illustrating the processing blocks of a GSM EGPRS mobile station in more detail including RF, baseband and signal processing blocks is shown in FIG. 12. The radio station is designed to provide reliable data communications at rates of up to 470 kbit/s. The GSM EGPRS mobile station, generally referenced 1200, comprises a transmitter and receiver divided into the following sections: signal processing circuitry 1218, baseband codec 1212 and RF circuitry section 1206.

In the transmit direction, the signal processing portion functions to protect the data so as to provide reliable communications from the transmitter to the base station 1202 over the channel 1204. Several processes performed by the channel coding block 1222 are used to protect the user data 1228 including cyclic redundancy code (CRC) check, convolutional coding, interleaving and burst assembly. The resultant data is assembled into bursts whereby guard and trail symbols are added in addition to a training sequence midamble that is added to the middle of the burst. Note that both the user data and the signaling information go through similar processing. The assembled burst is then modulated by a modulator 1220 which may be implemented as a 3π/8 offset 8PSK modulator.

In the receive direction, the output of the baseband codec is demodulated using a complementary 8PSK demodulator 1224. Several processes performed by the channel decoding block 1226 in the signal processing section are then applied to the demodulated output. The processes performed include burst disassembly, channel estimation, equalization utilizing the modified metric as taught by the present invention, described in detail supra, de-interleaving, convolutional decoding and CRC check. Optionally, soft value generation utilizing the modified metric as taught by the present invention and soft symbol to soft bit conversion may also be performed depending on the particular implementation.

The baseband codec converts the transmit and receive data into analog and digital signals, respectively, via D/A converter 1214 and A/D converter 1216. The transmit D/A converter provides analog baseband I and Q signals to the transmitter 1208 in the RF circuitry section. The I and Q signals are used to modulate the carrier for transmission over the channel.

In the receive direction, the signal transmitted by the base station over the channel is received by the receiver circuitry 1210. The analog signals I and Q output from the receiver are converted back into a digital data stream via the A/D converter. This I and Q digital data stream is filtered and demodulated by the 8PSK demodulator before being input to the channel decoding block 1226. Several processes performed by signal processing block are then applied to the demodulated output.

In addition, the mobile station performs other functions that may be considered higher level such as synchronization, frequency and time acquisition and tracking, monitoring, measurements of received signal strength and control of the radio. Other functions include handling the user interface, signaling between the mobile station and the network, the SIM interface, etc.

Computer Embodiment

Figure 13:
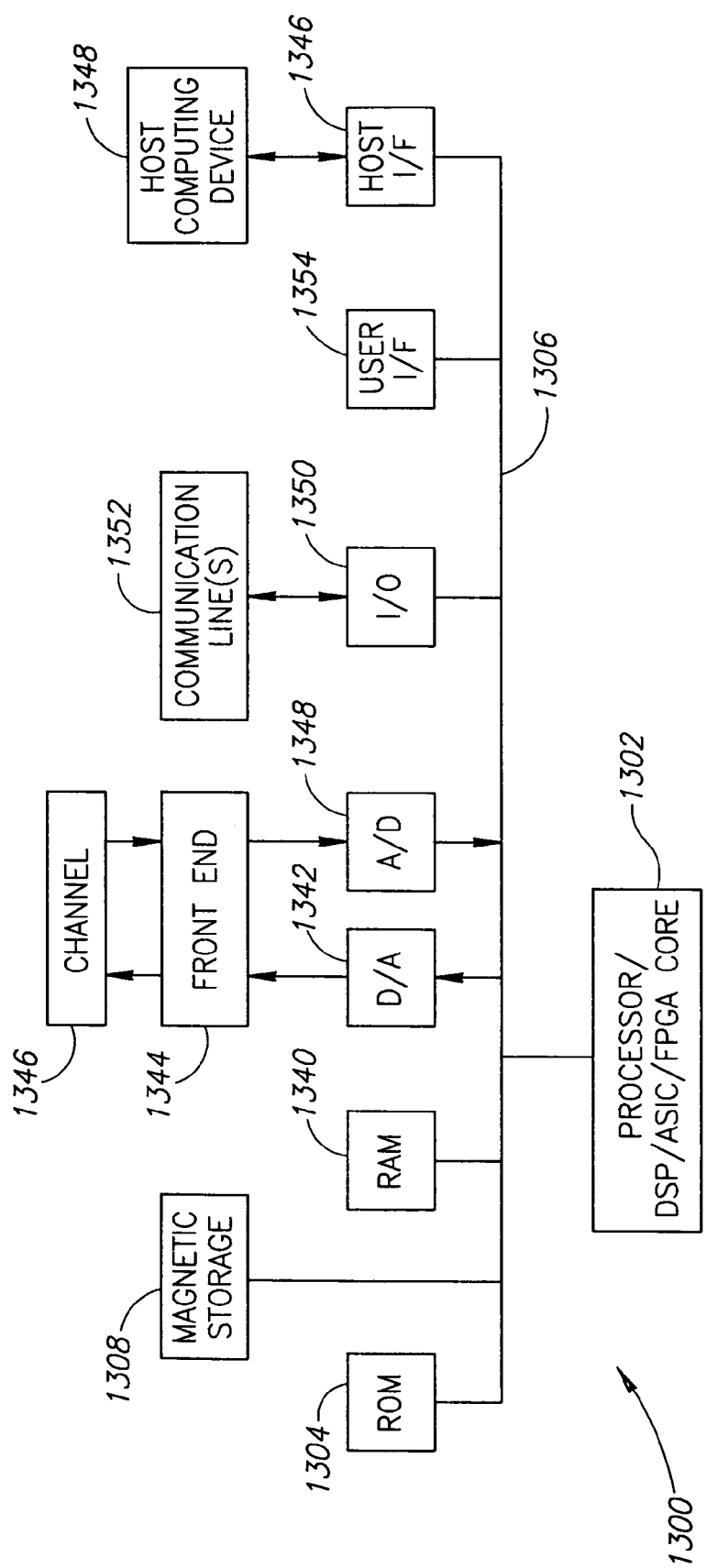
FIG. 13 is a block diagram illustrating an example computer processing system adapted to perform the SAIC scheme of the present invention.

In alternative embodiments, the present invention may be applicable to implementations of the invention in integrated circuits or chip sets, wired or wireless implementations, switching system products and transmission system products. For example, a computer is operative to execute software adapted to implement the SAIC scheme of the present invention. A block diagram illustrating an example computer processing system adapted to perform the SAIC scheme of the present invention is shown in FIG. 13. The system may be incorporated within a communications device such as a receiver or transceiver, some or all of which may be implemented in software, hardware or a combination of software and hardware.

The computer system, generally referenced 1300, comprises a processor 1302 which may include a digital signal processor (DSP), central processing unit (CPU), microcontroller, microprocessor, microcomputer, ASIC or FPGA core. The system also comprises static read only memory 1304 and dynamic main memory 1310 all in communication with the processor. The processor is also in communication, via bus 1306, with a number of peripheral devices that are also included in the computer system.

In the receive direction, signals received over the channel 1316 are first input to the RF front end circuitry 1314 which comprises a receiver section (not shown) and a transmitter section (not shown). Baseband samples of the received signal are generated by the A/D converter 1318 and read by the processor. Baseband samples generated by the processor are converted to analog by D/A converter 1312 before being input to the transmitter for transmission over the channel via the RF front end.

One or more communication lines 1322 are connected to the system via I/O interface 1320. A user interface 1324 responds to user inputs and provides feedback and other status information. A host interface 1326 connects a host device 1328 to the system. The host is adapted to configure, control and maintain the operation of the system. The system also comprises magnetic storage device 1308 for storing application programs and data. The system comprises computer readable storage medium that may include any suitable memory means, including but not limited to, magnetic storage, optical storage, semiconductor volatile or non-volatile memory, biological memory devices, or any other memory storage device.

The SAIC software is adapted to reside on a computer readable medium, such as a magnetic disk within a disk drive unit. Alternatively, the computer readable medium may comprise a floppy disk, removable hard disk, Flash memory card, EEROM based memory, bubble memory storage, ROM storage, distribution media, intermediate storage media, execution memory of a computer, and any other medium or device capable of storing for later reading by a computer a computer program implementing the method of this invention. The software adapted to implement the SAIC scheme of the present invention may also reside, in whole or in part, in the static or dynamic main memories or in firmware within the processor of the computer system (i.e. within microcontroller, microprocessor or microcomputer internal memory).

In alternative embodiments, the SAIC scheme of the present invention may be applicable to implementations of the invention in integrated circuits, field programmable gate arrays (FPGAs), chip sets or application specific integrated circuits (ASICs), wired or wireless implementations and other communication system products.

Other digital computer system configurations can also be employed to perform the SAIC method of the present invention, and to the extent that a particular system configuration is capable of performing the method of this invention, it is equivalent to the representative digital computer system of FIG. 13 and within the spirit and scope of this invention.

Once they are programmed to perform particular functions pursuant to instructions from program software that implements the method of this invention, such digital computer systems in effect become special purpose computers particular to the method of this invention. The techniques necessary for this are well-known to those skilled in the art of computer systems.

It is noted that computer programs implementing the method of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of computing a metric to be used in determining an estimate of a most likely sequence of symbols transmitted over a channel from a plurality of received samples, each received sample comprising an information component and an interference component, said method comprising the steps of:

estimating an error vector utilizing an error vector calculator by subtracting the convolution of known training sequence symbols with an estimate of said channel from said plurality of received samples corresponding to said training sequence;

estimating a noise correlation matrix utilizing a correlation matrix estimator by processing real and imaginary components of said error vector;

computing a plurality of summations utilizing a metric calculator by processing said plurality of received samples, said noise correlation matrix and a plurality of hypotheses of symbols that have been passed through said channel; and determining a minimum summation from said plurality of summations output of said metric calculator to yield said metric.

2. The method according to claim 1, further comprising the step of calculating a temporal error correlation by correlating between consecutive samples of said error vector and incorporating the resultant correlation into said computation of a plurality of summations by means of error prediction.

3. A method of computing a metric to be used in determining, from a plurality of received samples, an estimate of a most likely sequence of symbols transmitted over a channel, each received sample comprising an information component and an interference component, said method comprising the steps of:

estimating an error vector utilizing an error vector calculator by subtracting the convolution of known training sequence symbols with an estimate of said channel from said plurality of received samples corresponding to said training sequence;

de-rotating said error vector to generate a de-rotated error vector;

estimating a noise correlation matrix utilizing a matrix estimator by processing real and imaginary components of said de-rotated error vector;

computing a rotation compensated noise correlation matrix by processing said noise correlation matrix in accordance with a corresponding sample index;

computing a plurality of summations utilizing a metric calculator by processing said plurality of received samples, said rotation compensated noise correlation matrix and a plurality of hypotheses of symbols that have been passed through said channel; and determining a minimum summation from said plurality of summations resulting in said metric.

4. The method according to claim 3, wherein said information component comprises an 8PSK modulated signal.

5. The method according to claim 3, wherein said interference component comprises a GMSK modulated signal.

6. The method according to claim 3, wherein said rotation compensated noise correlation matrix is chosen from a group of eight possible matrices, each matrix corresponding to a different rotation offset between GMSK and 8PSK wherein 8PSK has $3\pi/8$ offset rotation and GMSK is considered BPSK with $\pi/2$, resulting in an offset rotation difference of $\pi/8$.

7. The method according to claim 3, further comprising the step of calculating a temporal error correlation by correlating between consecutive samples of said error vector and incorporating the resultant correlation into said computation of a plurality of summations by means of error prediction.

8. The method according to claim 3, wherein said error vector is de-rotated by an amount $\pi/8$ to generate said de-rotated error vector.

9. A computer-readable medium storing a computer program implementing the method of claim 3.

10. A method of implementing an equalizer in a radio receiver subjected to co-channel interference, said method comprising the steps of:

receiving a plurality of received samples, each received sample comprising an information component and an interference component;

calculating and assigning a metric to each sequence of symbols to be considered;

wherein the step of calculating said metric comprises the steps of:

estimating an error vector by utilizing an error vector calculator subtracting the convolution of known training sequence symbols with an estimate of said channel from said plurality of received samples corresponding to said training sequence;

de-rotating said error vector to generate a de-rotated error vector;

estimating a noise correlation matrix utilizing a correlation matrix estimator by processing real and imaginary components of said de-rotated error vector;

computing a rotation compensated noise correlation matrix by processing said noise correlation matrix in accordance with a corresponding sample index;

computing a plurality of summations utilizing a matrix calculator by processing said plurality of received samples, said rotation compensated noise correlation matrix and a plurality of hypotheses of symbols that have been passed through said channel;

determining a minimum summation from said plurality of summations resulting in a lowest metric representing a most likely sequence of symbols transmitted over said channel; and removing intersymbol interference introduced by said channel including said co-channel interference utilizing said lowest metric.

11. The method according to claim 10, wherein said information component comprises an 8PSK block code modulated signal.

12. The method according to claim 10, wherein said interference component comprises a GMSK modulated signal.

13. The method according to claim 10, wherein said rotation compensated noise correlation matrix is chosen from a group of eight possible matrices, each matrix corresponding to one of eight possible sample indexes of an 8PSK modulated signal.

14. The method according to claim 10, wherein said error vector is de-rotated by amount $\pi/8$ to generate said de-rotated error vector.

15. A computer-readable medium storing a computer program implementing the method of claim 10.

16. A computer program product characterized by that upon loading it into computer memory a metric calculation process is executed, said computer program product comprising:
a computer useable medium having computer readable program code means embodied in said medium for computing a metric to be used in determining an estimate of a most likely sequence of symbols transmitted over a channel from a plurality of received samples, each received sample comprising an information component and an interference component, said computer program product comprising:
computer readable program code means for estimating an error vector by subtracting the convolution of known training sequence symbols with an estimate of said channel from said plurality of received samples corresponding to said training sequence;
computer readable program code means for estimating a noise correlation matrix by processing real and imaginary components of said rotated error vector;
computer readable program code means for computing a plurality of summations by processing said plurality of received samples, said noise correlation matrix and a plurality of hypotheses of symbols that have been passed through said channel; and
computer readable program code means for determining a minimum summation from said plurality of summations resulting in said metric.

17. The computer program product according to claim 16, further comprising:
computer readable program code means for de-rotating said error vector to generate a de-rotated error vector;
computer readable program code means for estimating said noise correlation matrix by processing real and imaginary components of said de-rotated error vector; and
computer readable program code means for computing a rotation compensated noise correlation matrix by processing said noise correlation matrix in accordance with a corresponding sample index.

18. The computer program product according to claim 16, further comprising
computer readable program code means for calculating a temporal error correlation by correlating between consecutive samples of said error vector and incorporating said temporal error correlation into said computation of a plurality of summations by means of error prediction.

19. A radio receiver coupled to a single antenna, comprising:
a radio frequency (RF) receiver front end circuit for receiving a radio signal transmitted over a channel and down-converting the received radio signal to a baseband signal, said received radio signal comprising an information component and an interference component;
a demodulator adapted to demodulate said baseband signal in accordance with the modulation scheme used to generate said transmitted radio signal;
a channel estimation module adapted to calculate a channel estimate by processing a received training sequence and a known training sequence;
an equalizer adapted to remove intersymbol interference introduced by said channel utilizing a metric calculation stage and an estimate of said channel, said metric calculation stage comprising processing means adapted to;
estimate an error vector by subtracting the convolution of known training sequence symbols with said estimate of said channel from said plurality of received samples corresponding to said training sequence;
estimate a noise correlation matrix by processing real and imaginary components of said error vector;
compute a plurality of summations by processing said plurality of received samples, said noise correlation matrix and a plurality of hypotheses of symbols that have been passed through said channel;
determine a minimum summation from said plurality of summations resulting in said metric; and
a decoder adapted to decode the output of said equalizer to generate output data therefrom.

20. The method radio receiver according to claim 19, wherein said equalizer processing means is further adapted to:
de-rotate said error vector to generate a de-rotated error vector;
estimate said noise correlation matrix by processing real and imaginary components of said de-rotated error vector; and
compute a rotation compensated noise correlation matrix by processing said noise correlation matrix in accordance with a corresponding sample index.

21. The radio receiver according to claim 19, wherein said equalizer processing means is further adapted to calculate a temporal error correlation by correlating between consecutive samples of said error vector and incorporating said temporal error correlation into said computation of a plurality of summations by means of error prediction.

22. The receiver according to claim 19, wherein said receiver is adapted to receive and decode a global system for mobile communications (GSM) cellular signal.

23. A method of generating soft values from hard symbol decisions output of an equalizer, said method comprising the steps of:
calculating an error matrix incorporating consideration for I/Q correlation of noise in an interferer signal;
estimating an error vector utilizing an error vector calculator by subtracting the convolution of known training sequence symbols with an estimate of said channel from a plurality of received samples corresponding to said training sequence;
estimating a noise correlation matrix utilizing a correlation matrix calculator by processing real and imaginary components of said error vector;
computing a plurality of summations utilizing a matrix calculator by processing said plurality of received samples, said noise correlation matrix and a plurality of hypotheses of symbols that have been passed through said channel;
determining a minimum summation from said plurality of summations resulting in an error metric;
determining a conditional probability of said plurality of received samples given said hard symbol decision sequence; and
calculating log likelihood ratio (LLR) of said conditional probability to yield said soft decision values.

24. The method according to claim 23, further comprising the steps of:
- de-rotating said error vector to generate a de-rotated error vector;
- estimating said noise correlation matrix by processing real and imaginary components of said de-rotated error vector; and
- computing a rotation compensated noise correlation matrix by processing said noise correlation matrix in accordance with a corresponding sample index.

25. The method according to claim 23, further comprising the steps of calculating a temporal error correlation by correlating between consecutive samples of said error vector and incorporating said temporal error correlation into said computation of a plurality of summations by means of error prediction.

* * * * *